United States Patent
Tanaka et al.

[11] Patent Number: 5,808,740
[45] Date of Patent: Sep. 15, 1998

[54] MULTIAXIS DISTANCE MEASUREMENT DEVICE FOR NC MACHINE TOOLS

[75] Inventors: Kazunori Tanaka; Tatsuya Aoki, both of Kanagawa, Japan

[73] Assignee: Sokkia Company Limited, Tokyo, Japan

[21] Appl. No.: 696,520

[22] Filed: Aug. 14, 1996

[30] Foreign Application Priority Data

| Aug. 31, 1995 | [JP] | Japan | 7-223499 |
| Oct. 31, 1995 | [JP] | Japan | 7-283982 |
| Mar. 29, 1996 | [JP] | Japan | 8-075993 |

[51] Int. Cl.$^6$ .................................................. G01B 9/02
[52] U.S. Cl. .......................................... 356/358; 356/363
[58] Field of Search .................................. 356/358, 363, 356/345

[56] References Cited

U.S. PATENT DOCUMENTS 4,976,019 12/1990 Kitamura ............................... 356/358

FOREIGN PATENT DOCUMENTS

| 62-274202 | 11/1987 | Japan . |
| 210201 | 1/1990 | Japan . |
| 222503 | 1/1990 | Japan . |
| 5306904 | 11/1993 | Japan . |

*Primary Examiner*—Frank G. Font
*Assistant Examiner*—Robert Kim
*Attorney, Agent, or Firm*—Sixbey Friedman Leedom & Ferguson; Thomas W. Cole

[57] ABSTRACT

Interferometer 14 is equipped with a light directing mechanism part for causing the incoming laser beam to be reflected in the x, y, and z axis directions and a switching mechanism for the light directing mechanism part. Computer 20 provides driving commands sequentially to the NC controller 22 in accordance with the contents of a measurement program to thereby operate milling machine A in accordance with a prescribed procedure, calculates correction data by comparing the length measurement data, obtained at the laser head 12, with reference data, causes the correction value to be taken into the NC controller 22, and starts up the controller 24 and operates the switching mechanism of the multiaxis interferometer 14 after the end of work for each axis to change the axial direction measured.

10 Claims, 30 Drawing Sheets optical path of 1 optical path of 2 optical path of 3 optical path of 4 optical path of [1a]

optical path of [2a]

optical path of [3a]

optical path of [4a]

optical path of [1b]

optical path of [2b]

optical path of [3b]

optical path of [4b]

optical path of [1c]

optical path of [2c]

optical path of [3c]

optical path of [4c]

optical path of [1d]

optical path of [2d]

optical path of [3d]

optical path of [4d]

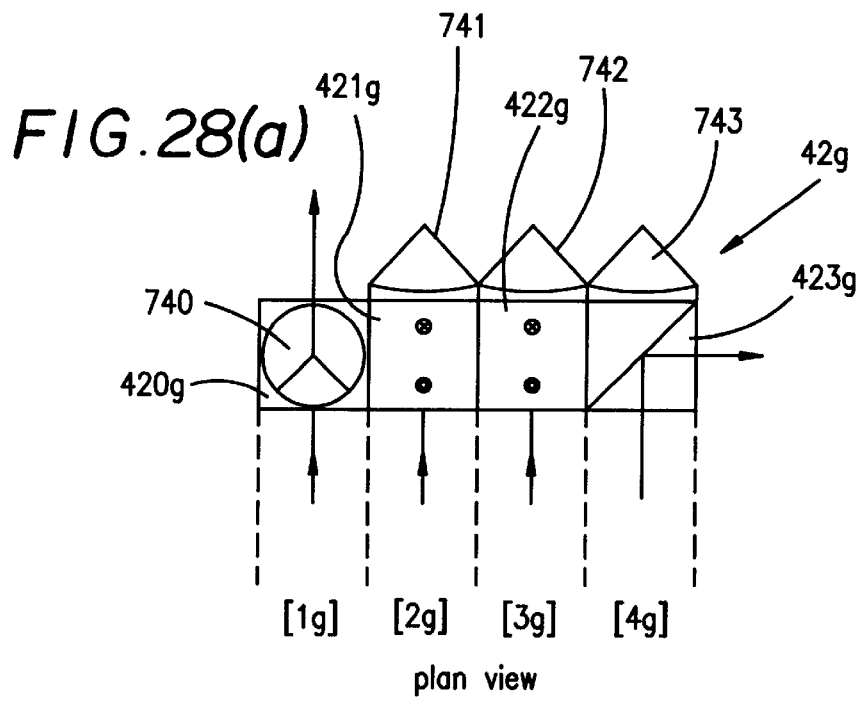
FIG. 28(a) plan view
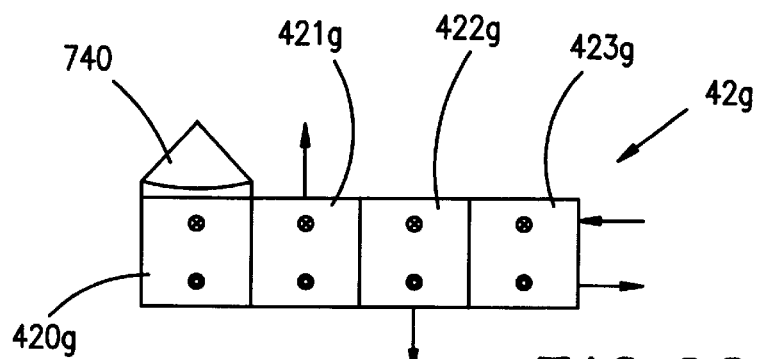
FIG. 28(b) front view
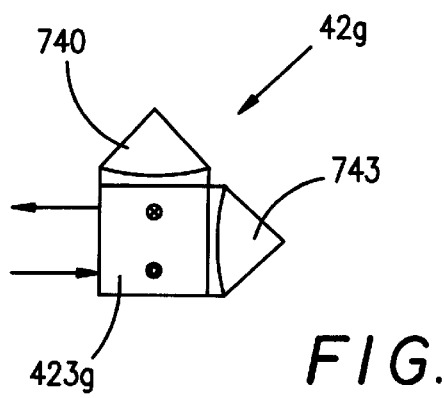
FIG. 28(c) side view

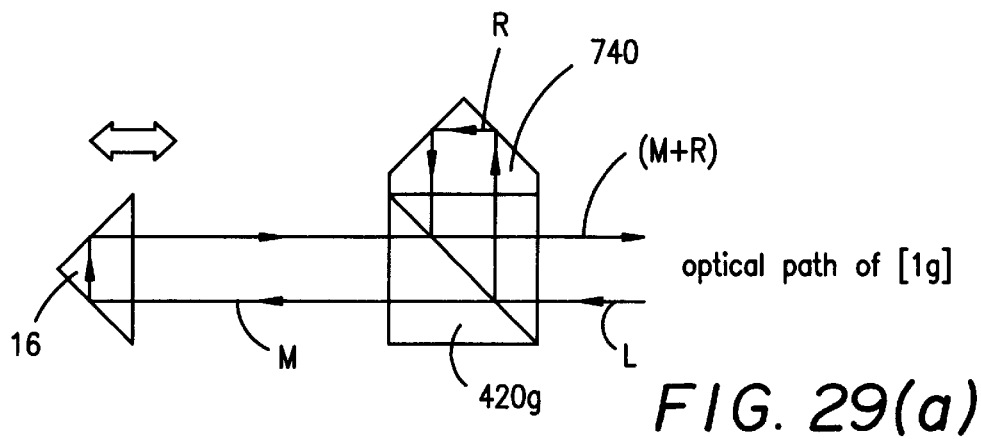
FIG. 29(a)
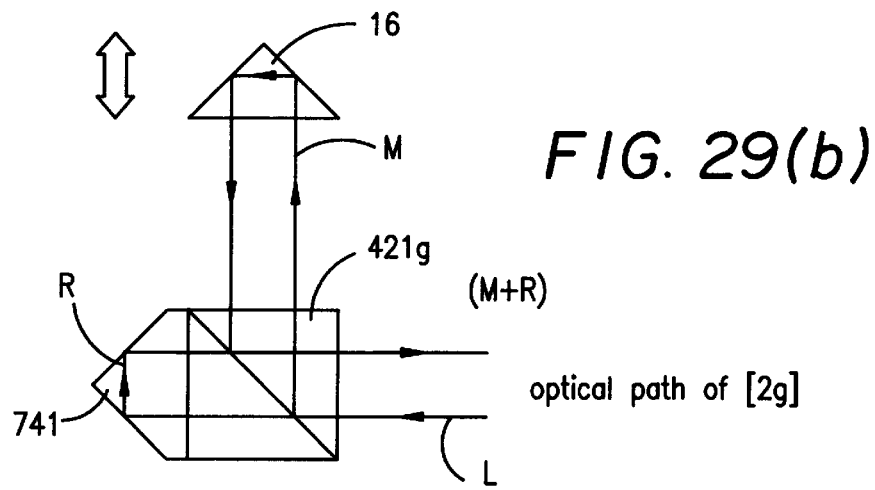
FIG. 29(b)
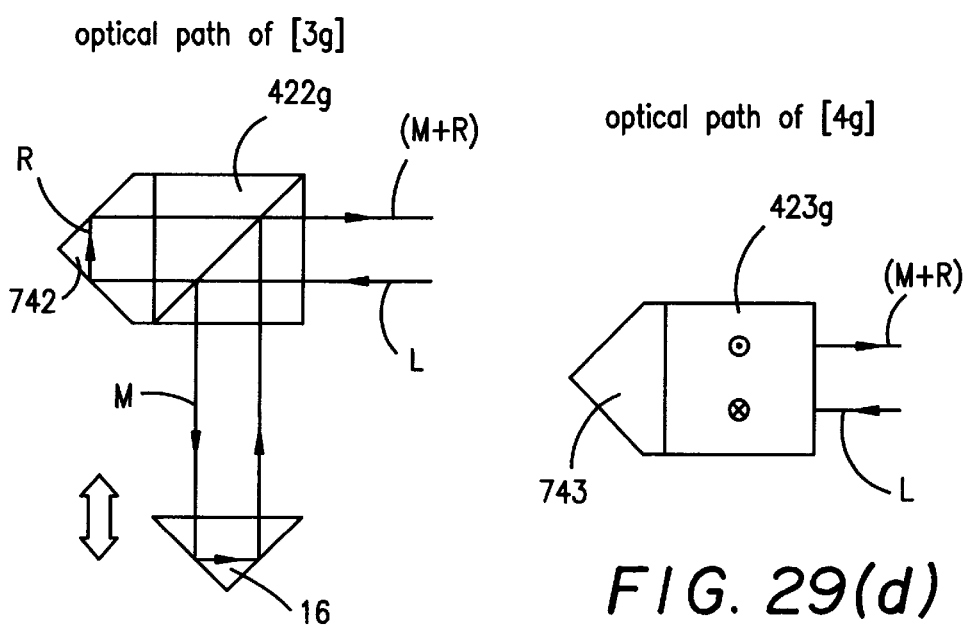
FIG. 29(c)
FIG. 29(d)

MULTIAXIS DISTANCE MEASUREMENT DEVICE FOR NC MACHINE TOOLS

BACKGROUND OF THE INVENTION

The present invention relates to multiaxis length measuring devices for NC machine tools and more particularly to a distance measurement device which enables automatic distance measurement of a plurality of axes of an NC machine tool.

Laser distance measurement devices are known as devices for measuring the movement distance of each axis of an NC machine tool with high accuracy. Such a type of laser distance measurement device has a basic arrangement comprising a laser head, equipped with a laser beam emitting part and an interference beam receiving part, a target prism (corner cube), which reflects the laser beam emitted from the laser beam emitting part, and an interferometer, which is disposed between the above parts.

To measure the movement distance of an NC machine tool, the target prism is fixed on a moving table or a spindle. The directions of movement of the NC machine tool usually consist of the three axial directions of x, y, and z, and if, for example, length measurements of a movable table of a knee type vertical milling machine A are to be made as shown in FIG. 22, the laser head 1 is first fixed on a tripod by a worker so that it faces the x axis direction, the interferometer 2 is then set at a position on the spindle of milling machine A and fixed to be in alignment with the optical axis of the laser head, and the target prism 3 is fixed at a position of the movable table along the extension of said optical axis.

This procedure is usually referred to as alignment and it takes about 15 minutes of working time to align each optical axis, set the respective home positions, etc. After the x axis alignment work, length measurements and corrections or calibrations are made while actually moving the table in the x axis direction with respect to the home position.

The process after the x axis alignment work is executed sequentially by a program in a control unit, such as a computer, that is connected to the NC controller and in this process, the checking and correcting of the x axis movement pitch and other various accuracy tests, such as tests that are in accordance with the contents of ISO tests, are performed automatically and the measurement results and corrections or calibrations are sequentially provided to the NC controller. Such measurements and corrections or calibrations take approximately 50 minutes for completion.

When the measurements for the x axis direction have been completed, the laser head 1, interferometer 2, and target prism 3 are arranged by the worker for the y axis direction in a manner similar to that described above and after the y axis alignment work, accuracy tests are performed automatically as described above. Thereafter, the z axis alignment work is performed and accuracy tests are performed automatically. The measurements for the three axial directions are thus completed.

However, the following technical problem has been raised concerning such a conventional distance measurement method for NC machine tools.

That is, with the length measurement method described above, since it takes about 15 minutes of working time to adjust the optical axis, set the home positions, etc. for each axis (x, y, z) and since the time (approximately 50 minutes) for the measurements and corrections or calibrations for each axis (x, y, z) are added to the above time, the entire process takes approximately 195 minutes.

In this case, the worker may perform other work while the automatic measurements for each axis (x, y, z) are being performed. A spare time of 50 minutes between each measurement process may seem long. However, this amount of time is actually short for a worker and he/she may not be able to concentrate on the other work or may lose time in the other work to cause delays in the alignment work for each measurement process. Such time management has therefore been extremely troublesome for workers.

SUMMARY OF THE INVENTION

In order to achieve the above object, the present invention provides a multiaxis distance measurement device for NC machine tools comprising a laser head equipping a light emitting part for emitting a laser beam and a light receiving part for receiving an interference beam, a multiaxis interferometer equipping a light directing mechanism part, which is disposed on the optical axes of the light emitting part and the light receiving part and then projects the incoming laser beam toward the orthogonal x, y, and z axes of an NC machine tool, and a switching mechanism for the light directing mechanism part, a plurality of reflecting targets, which are fixed on the measurement positions of the NC machine tool and receive the laser beam projected in the x, y, or z axis direction and reflects the beam back towards the multiaxis interferometer, a controller for controlling the switching mechanism, and a control unit, which operates the NC machine tool in the x, y, and z axis directions in accordance with a prescribed procedure, compares the length measurement data, obtained at the light receiving part of the laser head, with priorly set reference data to provide the NC machine tool with correction values, and commands the switching operation to the controller each time the measurements for one of the axes, x, y, and z, have been completed.

With a multiaxis distance measurement device with the above arrangement, the optical axis alignment of the multiaxis interferometer and the reflecting targets positioned in the x, y, and z axes needs to be performed only once and length measurements for all axes are thereafter performed in a continuous manner through the automatic switching of the emission direction of the interferometer after the length measurements for each axis.

In the invention of claim 2, the multiaxis interferometer comprises a casing having an entrance/exit window part which faces the laser head, a stage, which is disposed within the casing in a linearly movable or rotatably movable manner so that it may face the entrance/exit window part, an interferometer body having the light directing mechanism part, which emits the incoming laser beam in the x, y, and z axis directions, a moving mechanism for moving the stage linearly or rotatably to cause the light directing mechanism part to face the entrance/exit window part, and a detection means for detecting the stoppage position of the stage.

The interferometer body may also be equipped with a polarization beam splitter, which is disposed along the movement direction of the moving mechanism and fixed on the stage, and a light directing mechanism part, which is set at the rear of the polarization beam splitter, said light directing mechanism part having a part for causing the incoming beam from the polarization beam splitter to propagate rectilinearly, a part for reflecting the incoming beam from the polarization beam splitter upward or downward, and a part for reflecting the incoming beam from the polarization beam splitter to the side.

In this case, the measuring beam emitted from the light directing mechanism part may be reflected back along the same light path by the reflecting target set at the object of measurement.

The interferometer body may also be equipped with a polarization beam splitter, which is fixed to the rear side of the entrance/exit window part, and a light directing mechanism part, which is set on the stage, said light directing mechanism part having a part for causing the incoming beam from the polarization beam splitter to propagate rectilinearly, a part for reflecting the incoming beam from the polarization beam splitter upward or downward, and a part for reflecting the incoming beam from the polarization beam splitter to the side.

In this case, the measuring beam emitted from the light directing mechanism part may be reflected along a light path that is parallel to but different from the incident light path by the reflecting target set at the object of measurement.

The present invention has been proposed to resolve such a problem, and it is therefore an object of the invention to provide a multiaxis distance measurement device for NC machine tools which enables automatic length measurements for all of the axis, x, y, and z, upon performing the alignment work just once.

A primary advantage of the invention is to perform the measurements of each axis of an NC machine tool in a continuous manner automatically.

Another advantage of the invention is that, with the multiaxis distance measurement device for NC machine tools according to the present invention, since the length measurements for each axis can be performed automatically upon performing the alignment work just once to align the optical axes of the targets positioned in the x, y, and z axis directions, the worker will not have to be bound by the waiting time for the next work and can dedicate him/herself to other work.

BRIEF DESCRIPTION OF THE DRAWINGS

In order that the device by which the above-recited objects and advantages of the invention are achieved can be understood in detail, a more particular description of the invention will now be made by reference to a specific embodiment thereof which are illustrated in the accompanying drawings, which drawings forms part of this specification.

In the drawings:

FIGS. 28(a) to 28(c) are a front elevational view, plan view and side elevation view of an interferometer body of a multiaxis interferometer body of the preferred embodiment shown in FIG. 26.

FIGS. 29(a) to 29(d) are views explaining optical paths of each part of an interferometer shown in FIG. 28.

DESCRIPTION OF THE PREFERRED EMBODIMENT EMBODIMENTS

Figure 1:
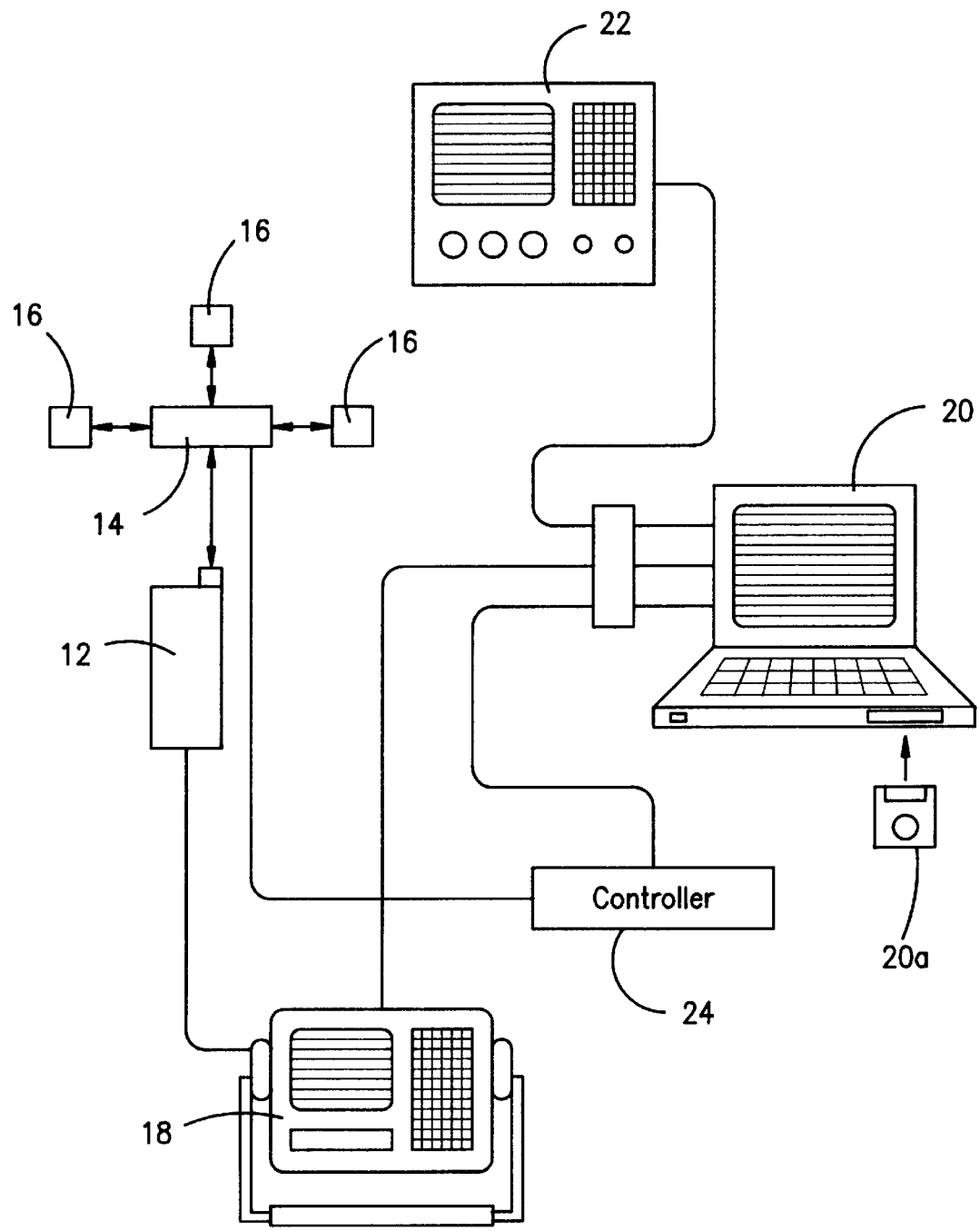
FIG. 1 shows the overall systematic arrangement of one preferred embodiment of the multiaxis distance measurement device for NC machine tools according to the present invention.

A preferred embodiment embodiment according to the present invention shall now be described in detail with reference to the attached drawings. FIGS. 1 thru 8 show a first preferred embodiment of the multiaxis laser interferometry distance measurement device for an NC machine tool according to the present invention. As can be seen from the systematic arrangement shown in FIG. 1, the distance measurement device shown in these Figures is comprised of a laser head 12 with built-in light emitting and light receiving parts, a multiaxis interferometer 14, three reflecting targets 16, a display 18 connected to the laser head 12, a computer (control unit) 20, an NC controller 22 for controlling the NC machine tool, and a controller 24 for the multiaxis interferometer 14.

The laser head 12 is equipped with a light emitting part, which emits a laser beam L of a certain wavelength, and a light receiving part, which receives the interference beam resulting from the interference of light at the multiaxis interferometer 14. The interference fringes of the interference beam received by this light receiving part are counted to calculate the distance from the interferometer 14 to reflecting target 16 and this calculation result is displayed on a display 18 and input to a computer 20.

The computer 20 sequentially provides an NC controller 22 with driving commands according to a software measurement program in a floppy disk 20a, etc., that is loaded in the computer 20, and thereby causes the NC controller 22 to operate the NC machine tool according to a prescribed procedure.

Figure 2:
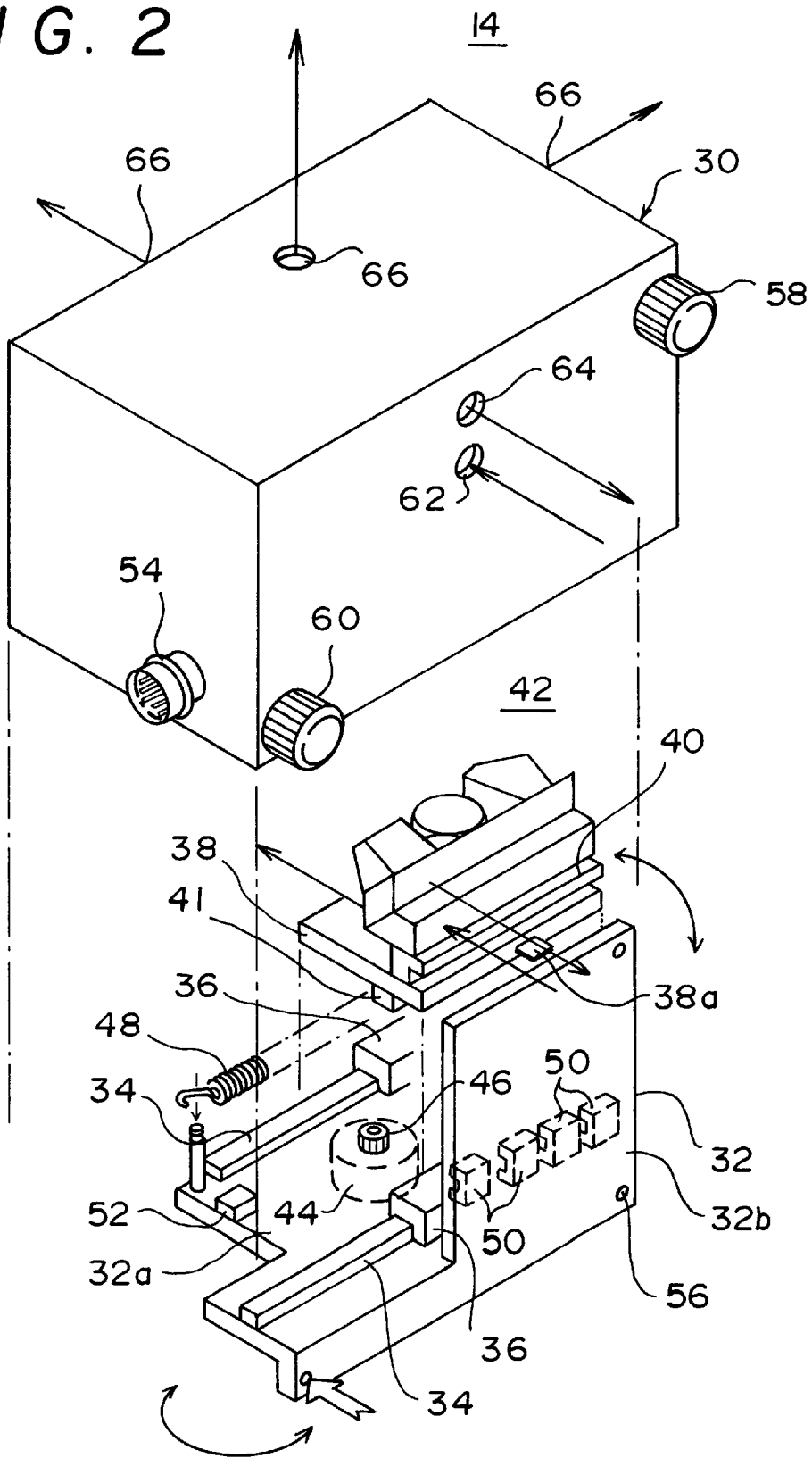
FIG. 2 is an exploded perspective view of the overall structure of the multiaxis interferometer of said multiaxis distance measurement device.
Figure 3:
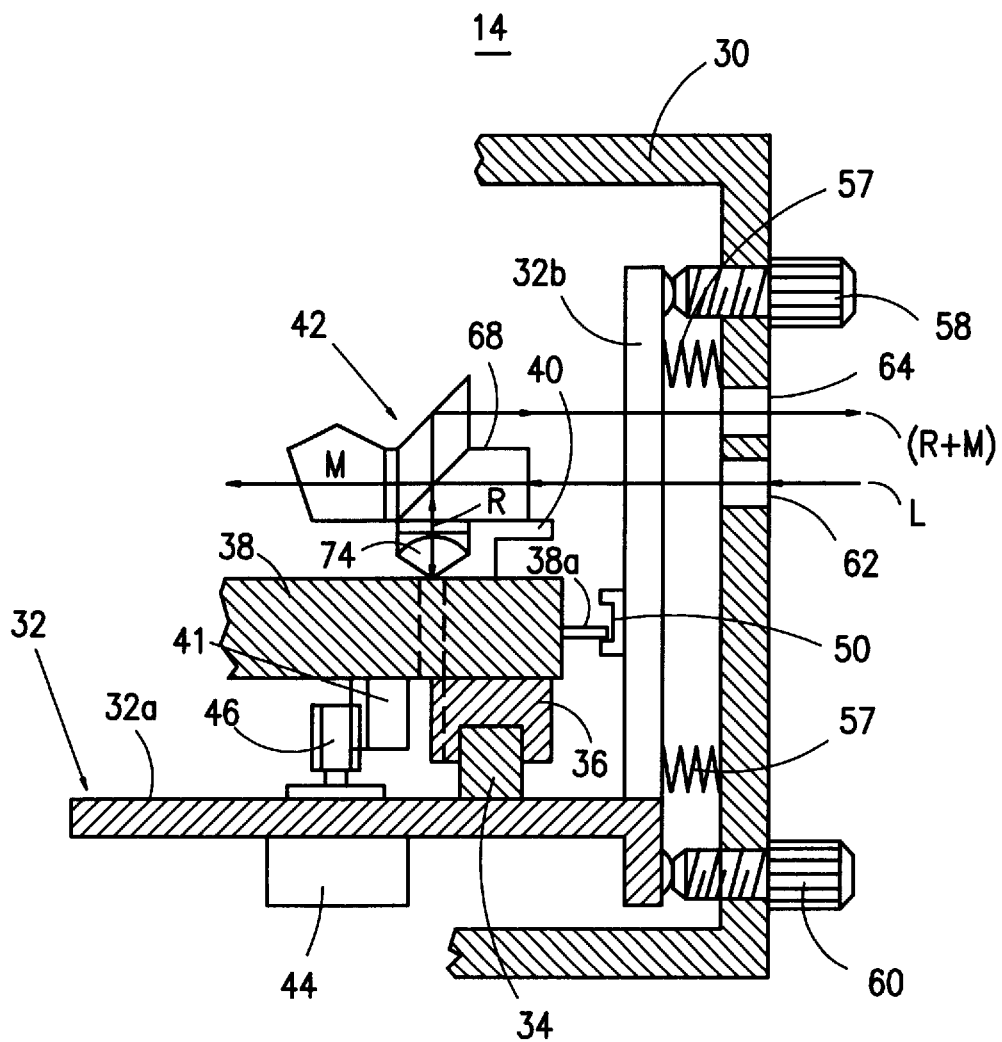
FIG. 3 is a cross-sectional view of said interferometer.

The structural details of the multiaxis interferometer 14 are shown in FIGS. 2 to 6. FIG. 2 is an exploded perspective diagram of the overall structure of the multiaxis interferometer 14 and FIG. 3 shows the cross-sectional structure of a part of the multiaxis interferometer 14.

The multiaxis interferometer 14 of the present preferred embodiment is formed in a box shape and is generally comprised of a rectangular box-shaped housing 30, an L-shaped mounting base 32 housed within the housing 30, a stage 38, which is set in a parallely movable manner via sliders 36 on a pair of linear guides 34, which are set in a parallel manner on the upper face of horizontal part 32a of the mounting base 32, and an interferometer body 42, which is set on the stage 38 via mounting block 40.

A rack 41, which is parallel to the linear guides 34, is provided on the lower face of the stage 38. This rack 41 is engaged with a pinion 46 attached to the output shaft of an ultrasonic motor 44 provided on the lower face of horizontal part 32a. Stage 38 is thus made movable along linear guides 34 in accordance with the normal and reverse rotation of motor 44. A tension spring 48 is spanned across the end part of the stage 38 and mounting base 32 and the backlash of the rack 41 and pinion 46 mechanism is eliminated by the urging force of this tension spring 48.

A plurality of position detecting photointerrupters 50 are fixed along a straight line on the inner side of vertical part 32b of the mounting base 32 and the position of the stage 38 is detected when a detection piece 38a provided on the side of the stage 38 blocks the gap between the light emitting part and the light receiving part of a photointerrupter 50.

Furthermore, on both ends in the longitudinal direction of the horizontal part 32a (of which only one end is shown in the Figure), are fixed limit switches 52 which, upon coming into contact with the stage 38, respectively detect the start-of-movement and end-of-movement positions of the stage 38.

The lead wires of motor 44, photointerrupters 50, and limit switches 52 are connected to the controller 24 via connector 54, which is disposed on one side of the housing 30.

The corner of one side of vertical part 32b of the mounting base 32 is coupled via a spherical bearing 56 to the inner side of the front face of the housing 30 and is supported to the inner side of the front face of the housing 30 by means of a plurality of tension springs 57.

On the upper part of the front face of the housing 30 is provided a vertical direction adjusting knob 58, which is located along the vertical extension of spherical bearing 56 and in contact with the front face of vertical part 32b. By pushing the upper part of vertical part 32b by screwing in adjusting knob 58, the angle in the vertical direction of the mounting base 32 may be adjusted finely against the spring force of springs 57.

Also, on the lower part of the front face of the housing 30 is provided a parallelism adjusting knob 60, which is located along the horizontal extension of spherical bearing 56 and in contact with the front face of vertical part 32b. The parallelism of the mounting base 32 can be adjusted by operating this parallelism adjusting knob 60.

Furthermore, on the upper central part of the front face of the housing 30 is opened an entrance window part 62 for letting in the laser beam emitted from the laser head 12 and above this entrance window part 62 is opened an exit window part 64 for transmitting the interference beam from the interferometer 14.

On the centers of the upper and lower faces, on the rear face, and on one side (the side opposite the face on which connector 54 is mounted) of the housing 30 are opened laser entrance/exit window parts 66, which respectively face the x, y, and z axis directions. The interferometer body 42 is moved to be aligned with these windows. Through holes (not shown) are also bored through the stage 38 and mounting base 32 at the positions corresponding to the entrance window part 66 provided on the lower face of the housing 30.

Figure 4A:
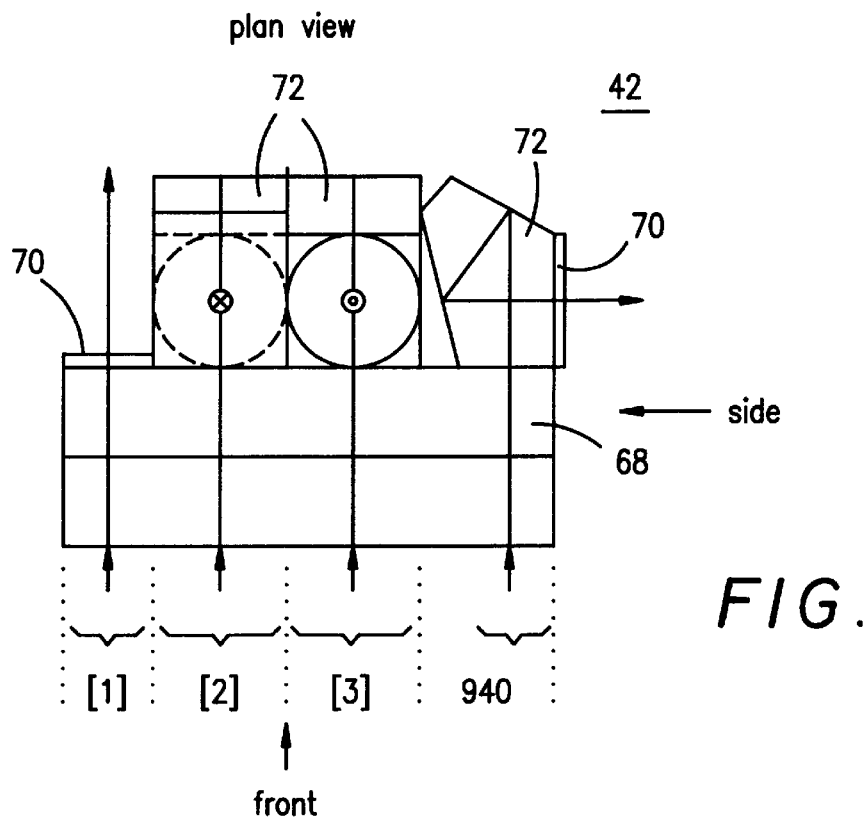
FIG. 4 shows three views of the interferometer body of said interferometer.
Figure 4B:
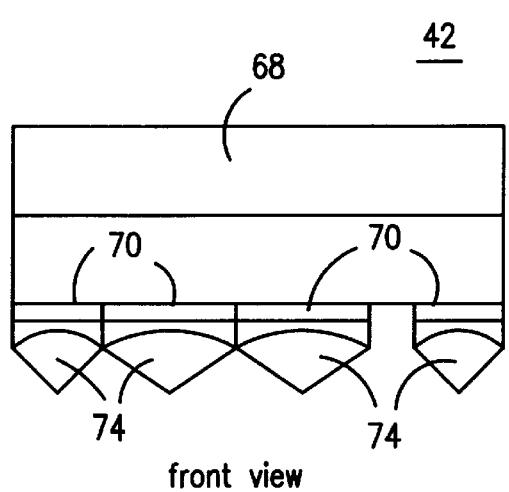
Figure 4C:
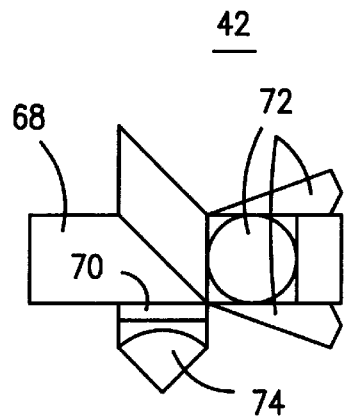
Figure 5A:
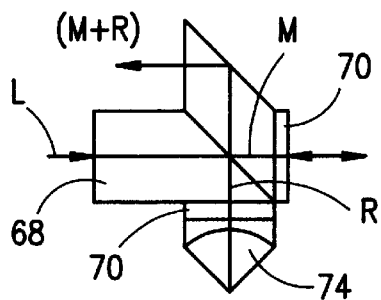
FIGS. 5(a) to 5(d) are explanatory diagrams of the light paths of the respective parts shown in the plan view of FIG. 4.
Figure 5B:
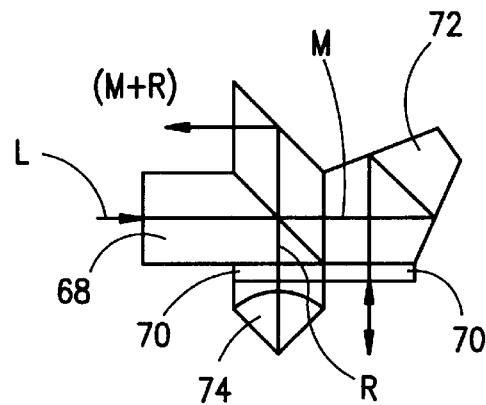
Figure 5C:
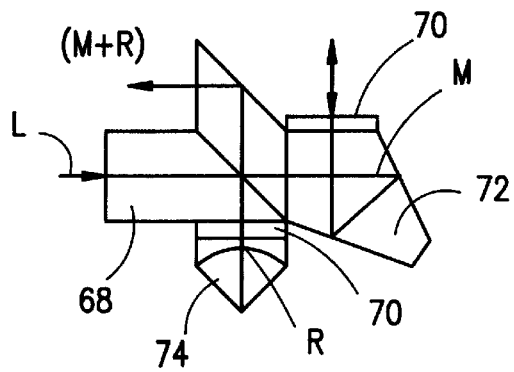
Figure 5D:
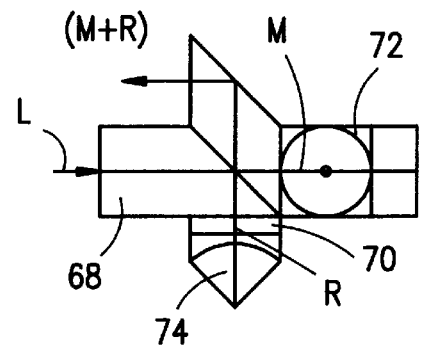
Figure 6:
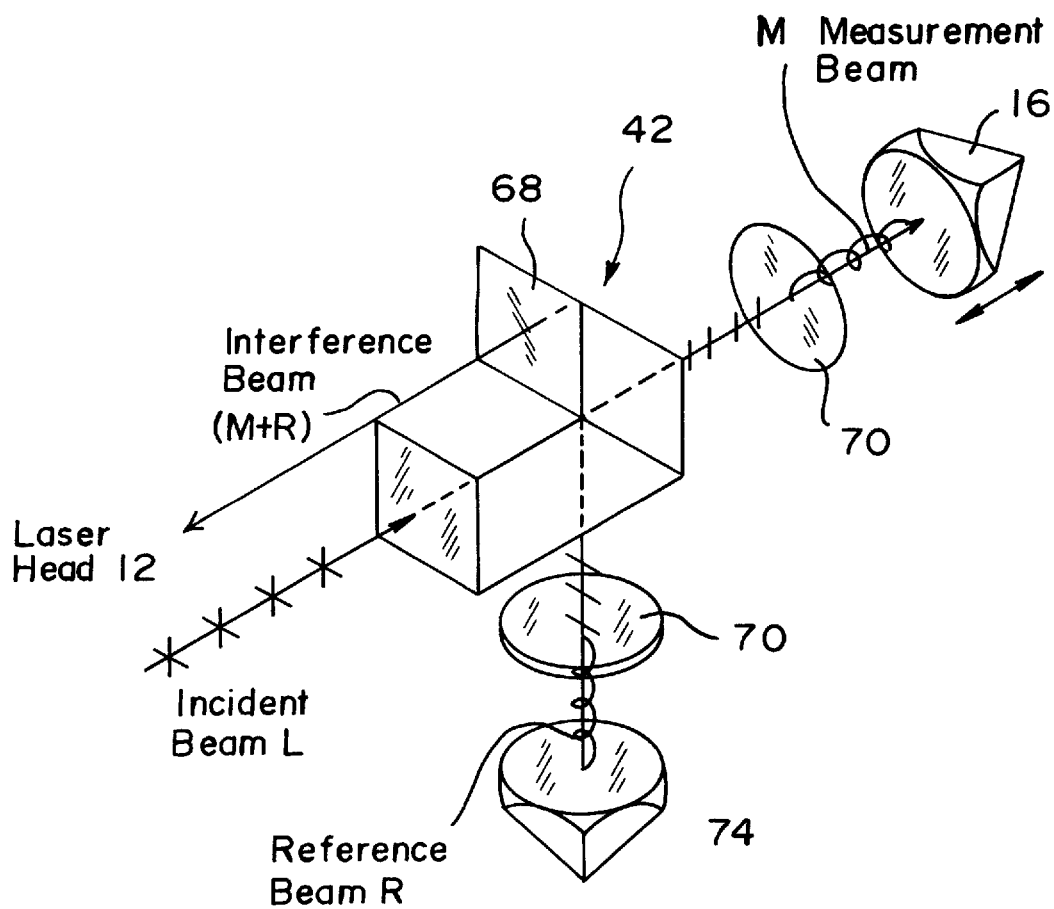
FIG. 6 is a schematic diagram which shows the measurement principles of the interferometer body.

FIGS. 4 to 6 show structural details of the interferometer body 42. The interferometer body 42 is equipped with a polarization beam splitter 68, which is disposed along the longitudinal direction of the stage 38 with its lower side face facing entrance window 62 and its upper side face facing laser exit window 64, and a light directing mechanism part 69, which is disposed to the rear side of polarization beam splitter 68.

The light directing mechanism part 69 is partitioned into parts [1], [2], [3], and [4] which have polarization beam splitter 68 as an optical component in common. Part [1] has only an ¼ wave plate 70 disposed along the longitudinal direction on the measuring beam emission surface of polarization beam splitter 68, part [2] has a pentagonal prism 72, which comprises the optical refraction mechanism, disposed with its light emission direction being pointed downwards and an ¼ wave plate 70 disposed on the light emission surface of pentagonal prism 72, part [3] has a pentagonal prism 72 disposed with its light emission direction being pointed upwards and an ¼ wave plate 70 disposed on the light emission surface of pentagonal prism 72, and part [4]

has a pentagonal prism 72 disposed with its light emission direction being pointed to the side and an ¼ wave plate 70 disposed on the light emission surface of pentagonal prism 72.

Four fixed corner cubes 74, which reflect the reference and measuring beams split by polarization beam splitter 68 back to the upper side of polarization beam splitter 68, are respectively disposed via ¼ wave plates 70 on the lower central parts of the above parts [1] to [4].

FIG. 6 shows the measurement principles of the interferometer body 42. Although only the light path for part [1] is shown in this example, the measurement principles are the same for the other parts except that the light path is bent by a pentagonal prism 72.

As shown in this Figure, the 45° linearly polarized incoming beam L, which is emitted from the laser head, is split by polarization beam splitter 68 into reference beam R, which propagates towards the fixed corner cube 74, and measuring beam M, which propagates towards reflecting target 16 disposed at the measurement position. The reference and measuring beams R and M then pass through ¼ wave plates 70 and are thereby circularly polarized.

Upon being respectively reflected by the corner cube 74 and reflecting target 16, the reference and measuring beams R and M become circularly polarized in the reverse rotation direction and, upon passing through the ¼ wave plates 70 again, become linearly polarized beams with a polarization angle that differs by 90° with respect to the polarization angle at the time of initial passage through the ¼ wave plates 70.

The measuring beam M, which was initially transmitted through polarization beam splitter 68, is now reflected by beam splitter 68 and the reference beam R, which was initially reflected by polarization beam splitter 68, is now transmitted through beam splitter 68 and in this process, the measuring beam M and the reference beam R interfere with each other. The interference beam (M+R) passes above the incoming beam L and is received by the light receiving part of the laser head 12 via laser exit window 64.

If the position of reflecting target 16 is moved forward or backward in the meantime, the condition of the interference fringes of interference beam (M+R) changes. Thus, by electrically counting the amount of this change, the distance from beam splitter 68 to reflecting target 16 is measured and this measurement result is displayed on display 18.

FIG. 5 shows the details of the respective light paths of the four parts [1] to [4] of the interferometer body 42 described above. At part [1], shown in (a) of said Figure, the incoming beam L is split into measuring beam M, which is rectilinearly transmitted through polarization beam splitter 68, and reference beam R, which proceeds downwards so as to be orthogonal to measuring beam M, and the interference beam (M+R) passes above and in the reverse direction of the incoming beam L.

At part [2], although the reference beam R and the interference beam (M+R) travel along the same light paths as those of part [1], the measuring beam M is reflected by pentagonal prism 72 and proceeds parallel to and in the same direction as reference beam R towards reflecting target 16.

At part [3], although the reference beam R and the interference beam (M+R) travel along the same light paths as those of part [1], the measuring beam M is reflected by pentagonal prism 72 and proceeds parallel to but in the opposite direction of reference beam R towards reflecting target 16.

At part [4], although the reference beam R and the interference beam (M+R) travel along the same light paths as those of part [1], the measuring beam M is reflected by pentagonal prism 72 and proceeds towards reflecting target 16 in the direction orthogonal to the optical axis of the incoming beam L.

Figure 7:
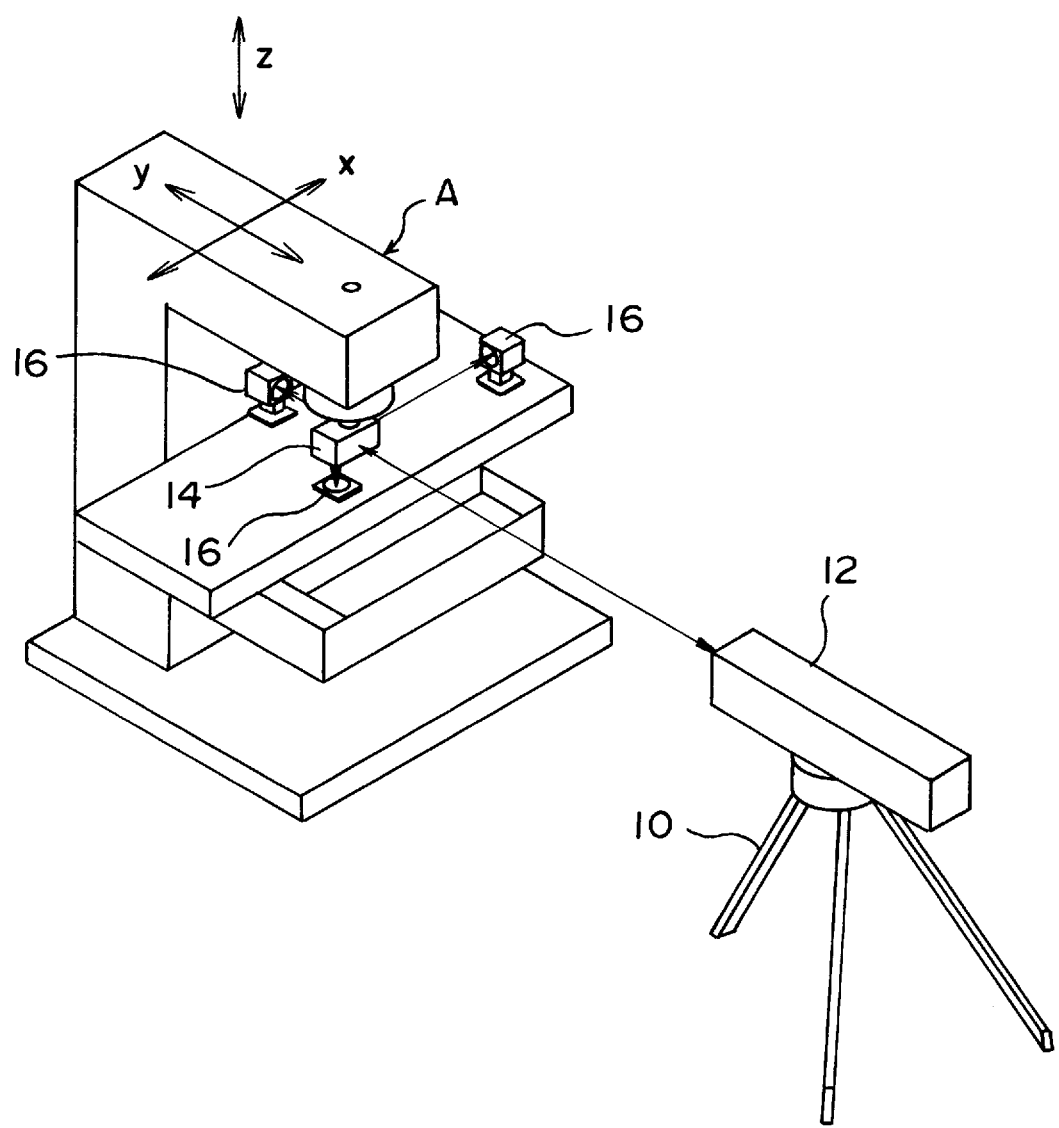
FIG. 7 is a schematic diagram which shows the case where the multiaxis distance measurement device according to the present invention is applied to a knee type milling machine.

An example of how a multiaxis measuring device with the above arrangement is used to perform measurements and corrections or calibrations of an NC machine tool shall now be described. FIG. 7 shows the conditions by which the multiaxis measuring device according to the present invention is used to measure the accuracies of movement of the three axes of an NC machine tool (milling machine A) and to correct these accuracies.

As shown in this Figure, a laser head 12, of a type in which light emitting and receiving parts are built in, is supported on tripod 10 and set to face the front face of milling machine A, which is the measured object. The multiaxis interferometer 14 is fixed on the spindle position, which is a fixed member of milling machine A, for example, by attaching onto the spindle unit or by the use of magnets, etc.

At movable parts of milling machine A in the x axis direction and the y axis direction of the table and in the z axis direction, which is directly below the multiaxis interferometer 14, are respectively fixed reflecting targets 16 in a manner facing the interferometer 14.

With the multiaxis interferometer 14 in the present example, the abovementioned part [1] is set to be aligned with the y axis direction, part [2] is set to be aligned with the z axis direction, and part [4] is set to be aligned with the x axis direction. The optical axis of the laser head 12 is set on entrance and exit window parts 62 and 64 of the multiaxis interferometer 14. Such alignment work for measurement is completed upon performing it once at the beginning and measurements of milling machine A are thereafter made in a fully automatic manner with the laser head 12, interferometer 14, and reflecting targets 16 being fixed.

The initial alignment work performed by the worker for measurement will consist of aligning the optical axes in the three directions and setting the home positions in the three directions. This work will be completed in approximately 25 minutes.

Figure 8:
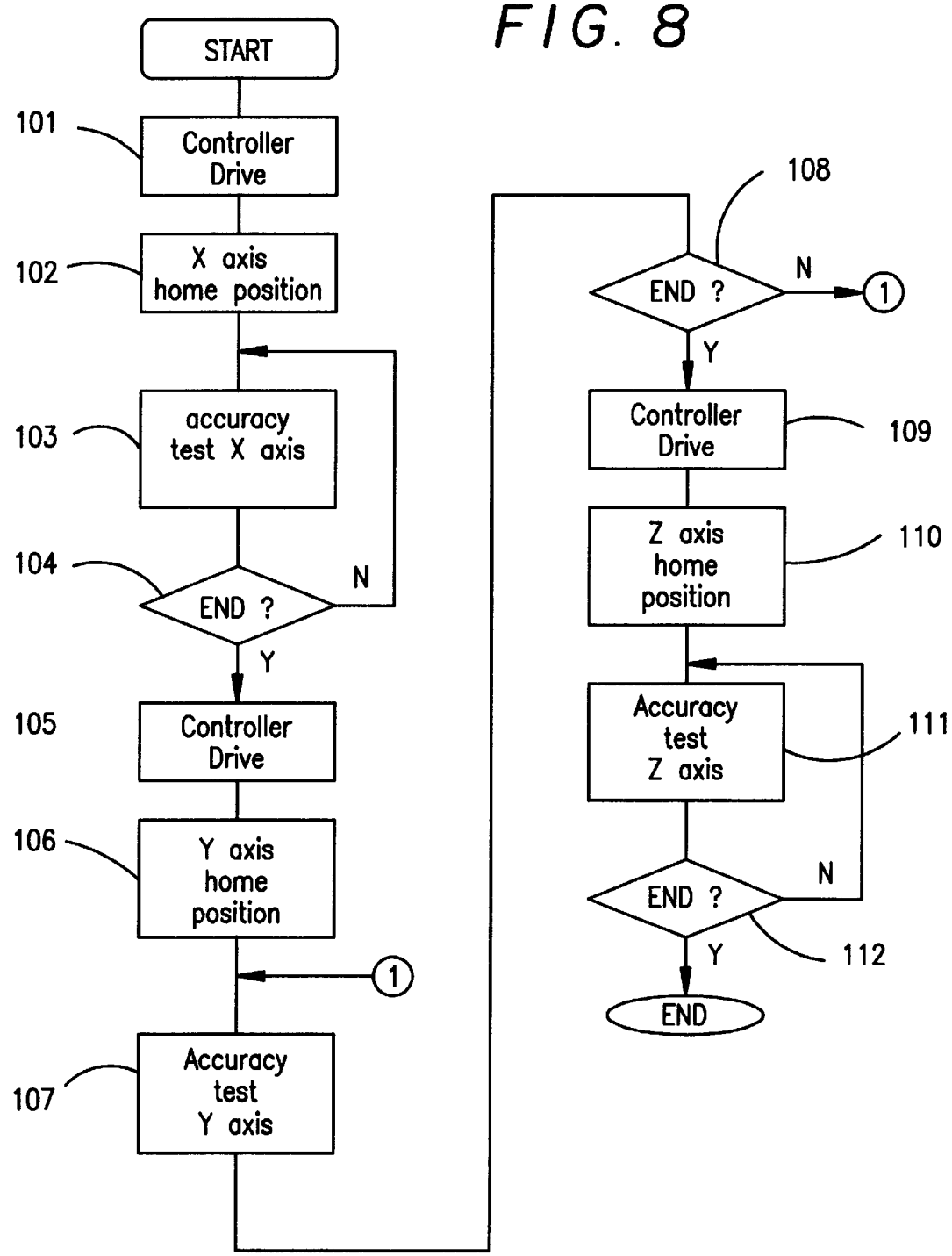
FIG. 8 is a flowchart which shows one example of the measurement process procedure using the multiaxis distance measurement device according to the present invention.
Figure 9:
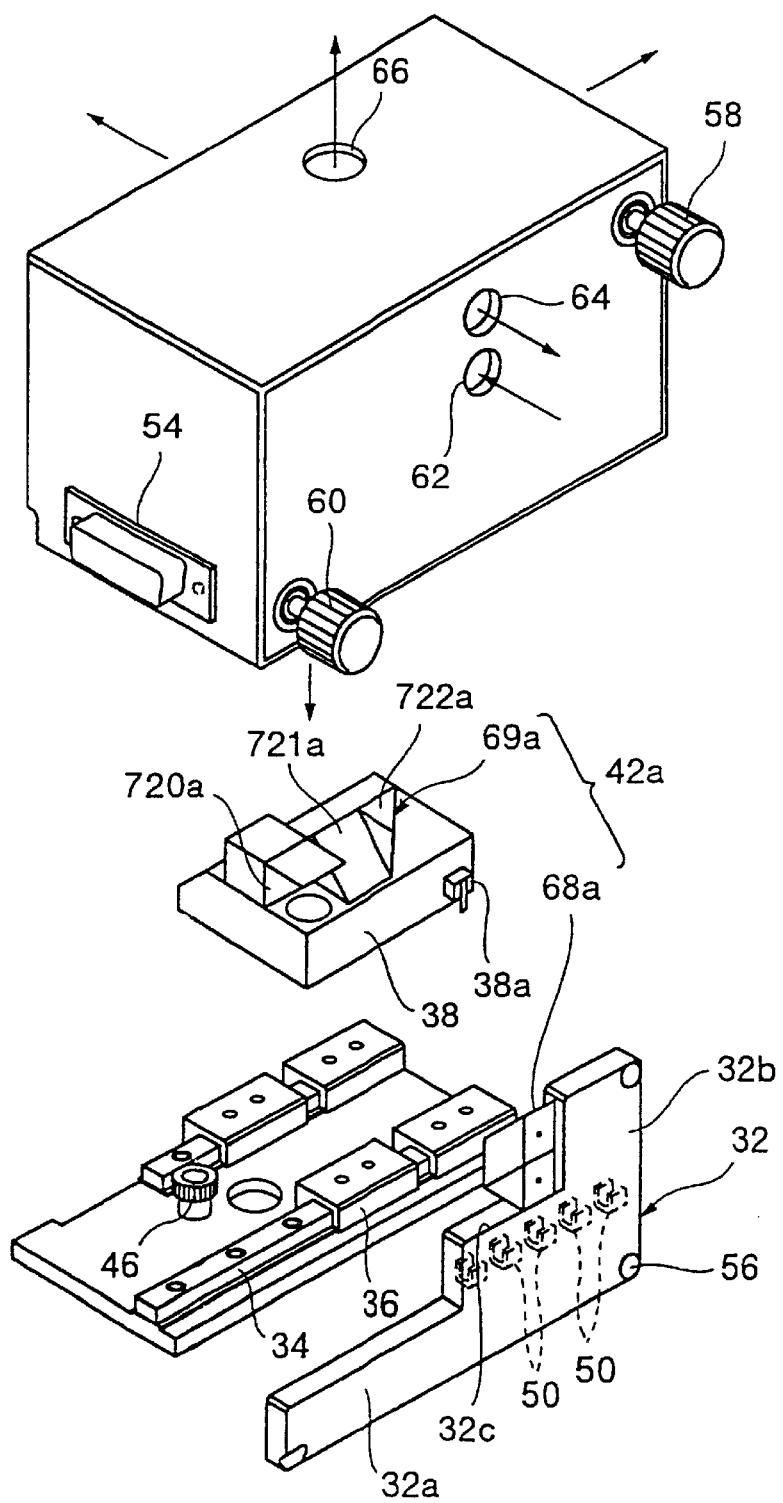
FIG. 9 is an exploded perspective view of the overall structure of the multiaxis interferometer of a second preferred embodiment of the multiaxis distance measurement device for NC machine tools according to the present invention.
Figure 10:
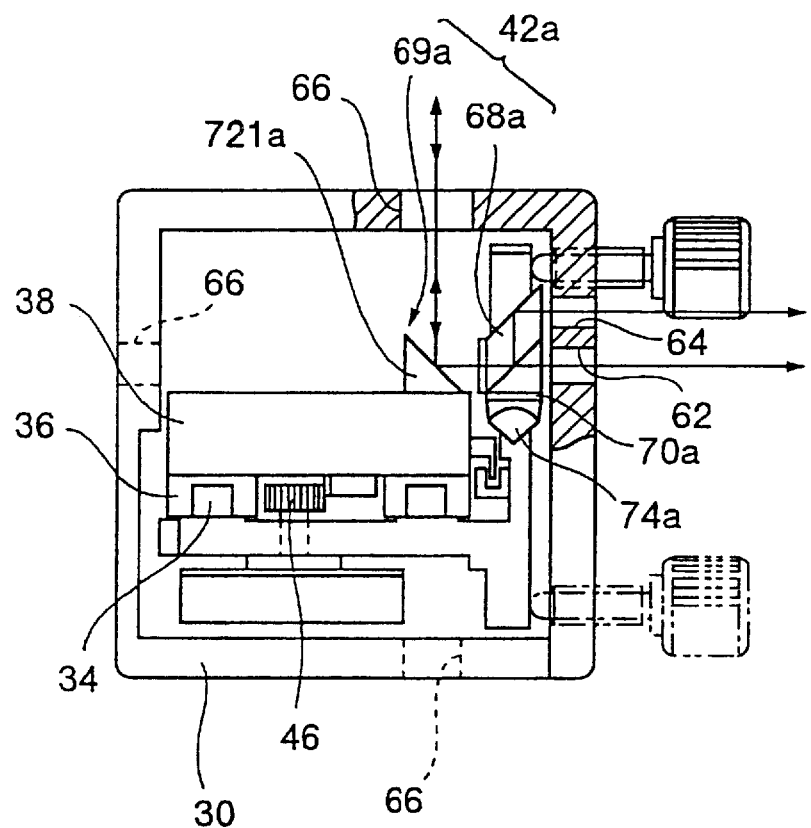
FIG. 10 is a cross-sectional view which shows the assembled condition of the multiaxis interferometer of FIG. 10.
Figure 11:
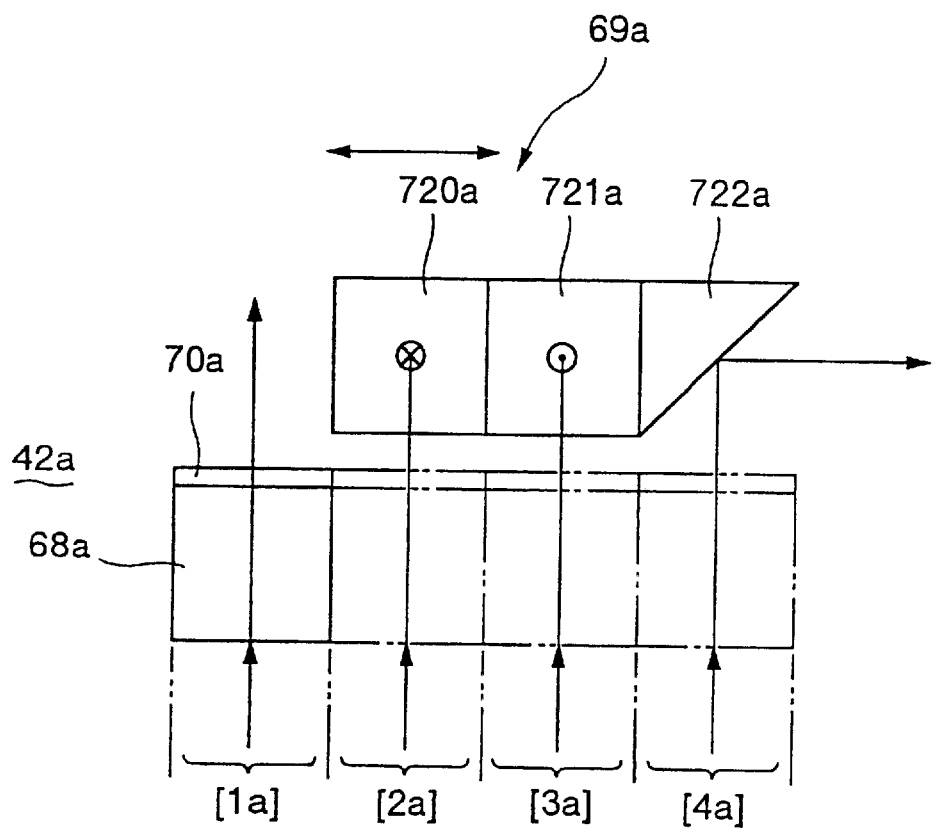
FIG. 11 is a plan view of the interferometer body of said interferometer.

FIG. 8 shows an example of the control procedure performed by the computer 20 after the above work has been completed. When the procedure shown in this Figure starts, command signals are transmitted to the controller 24 at step 101 and motor 44 is driven to set part [4] of the interferometer body 42 at a position where it faces the entrance and exit window parts 62 and 64.

Next, at step 102, control signals are transmitted to the NC controller 22 and upon receiving these signals, the NC controller 22 moves milling machine A and positions it at the home position along the x axis. At step 103, driving commands are sequentially provided to the NC controller 22 of milling machine A in accordance with the contents of the measurement software program in floppy disk 20a, etc. loaded in the computer 20 to thereby operate milling machine A according to a prescribed procedure.

The measurement result data, which change in accordance with such operations, are then compared with reference data incorporated in the program and the comparison results are used to calculate correction data, such as the pitch error, and these correction values are taken in by the NC controller 22. The accuracy tests for such a case may include the repeated positioning accuracy test, the repeatedly reversed positioning accuracy test, ISO-230-2, etc. Although the working time will differ according to the test items, it will be approximately 50 minutes as in conventional cases.

When it has been judged at step 104 that all of the tests for the x axis have been completed, the computer 20 commands the start-up of the controller 24 at step 105 to cause the switching mechanism of the multiaxis interferometer 14 to perform the switching operation so that the measurement optical axis will be switched to the y axis. To be more specific, motor 44 is driven so that part [1] of the interferometer body 42 will be selected and set to the position where it faces entrance and exit window parts 62 and 64.

After this switching operation has been confirmed, the various accuracy tests for the y axis are performed according to procedures similar to those described above (steps 106 to 108) and when it is judged at step 108 that the measurements for the y axis have ended, the measurement optical axis is switched to the z axis and procedures similar to the above are repeated. After the completion of the accuracy tests for the z axis, the system is stopped (steps 109 to 112).

The total working time for the above process is about 175 minutes and since the automatic measurement time, from which the time for initial alignment by the worker is excluded, is 150 minutes, the worker is provided with adequate spare time which may be used effectively for other work and since practically all of the work is completed after the completion of the work by the worker, the equipment can be left alone thereafter and the worker will not have to be troubled by the management of working time.

FIGS. 9 to 12 show a second preferred embodiment according to the present invention and the parts which are the same as or equivalent to those of the preferred embodiment described above are provided with the same symbols and their description shall be omitted. Only the characteristic points of this preferred embodiment shall be described next. As in the second preferred embodiment described above, the interferometer body 42a in the second preferred embodiment shown in these Figures is comprised of a polarization beam splitter 68a and a light directing mechanism part 69a, which is disposed to the rear of polarization beam splitter 68a.

Polarization beam splitter 68a is fixed to cutout part 32c, which is provided at vertical part 32b of the mounting base 32, and is set so that its front side faces the laser beam entrance and exit window parts 62 and 64. ¼ wave plates 70a are fixed respectively to the lower side and rear side of polarization beam splitter 68a and a corner cube 74a is fixed integrally to the lower side of one of the ¼ wave plates 70a.

As in the first preferred embodiment described above, light directing mechanism part 69a is fixed on the stage 38 and is comprised of a part [1a], which causes the incoming light L from polarization beam splitter 68a to propagate rectilinearly, a part [2a], which reflects the incoming reflects the incoming light L from polarization beam splitter 68a downward, a part [3a], which reflects the incoming light L from polarization beam splitter 68a upward, and a part [4a], which reflects the incoming light L from polarization beam splitter 68a to the right side and these parts are disposed in a single row.

To be more specific, part [1a] is not provided with anything. Part [2a] is provided with a reflecting mirror 720a which reflects the incoming light L downward. Part [3a] is provided with a reflecting mirror 721a which reflects the incoming light L upward. Part [4a] is provided with a reflecting mirror 722a which reflects the incoming light L to the right side.

FIG. 12 shows the light paths of the respective parts [1a] to [4a] when beam splitter 68a is positioned respectively at the front sides of these parts [1a] to [4a] upon moving the stage 38 by driving motor 44. The relative positional relationships between the respective parts of light directing mechanism part 69a and the polarization beam splitter 68a in this case will be the same as those for the case when the position of light directing mechanism part 69a is fixed and polarization beam splitter 68a is moved. These relationships are thus shown in FIG. 11 (the same holds for the third and fourth preferred embodiments described below).

Figure 12A:
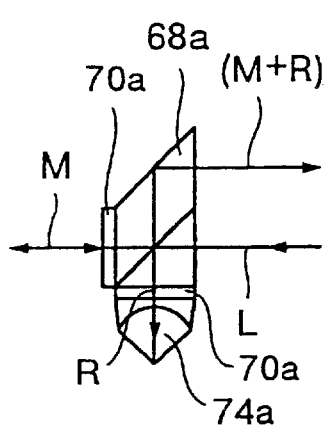
FIGS. 12(a) to 12(d) are explanatory diagrams of the light paths of the respective parts of the interferometer body shown in FIG. 11.
Figure 12B:
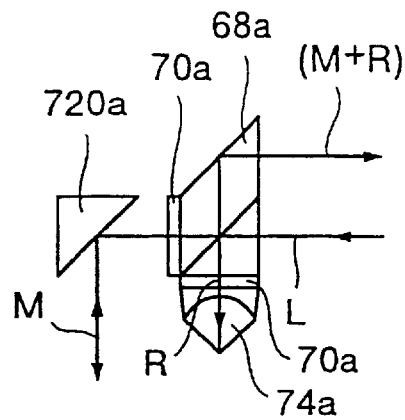
Figure 12C:
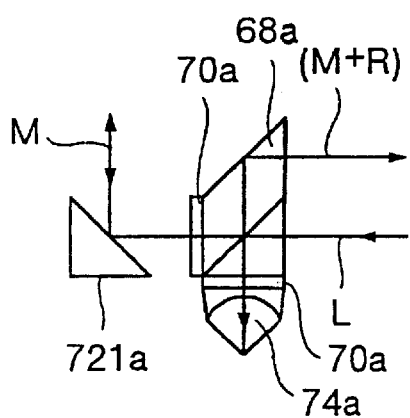
Figure 12D:
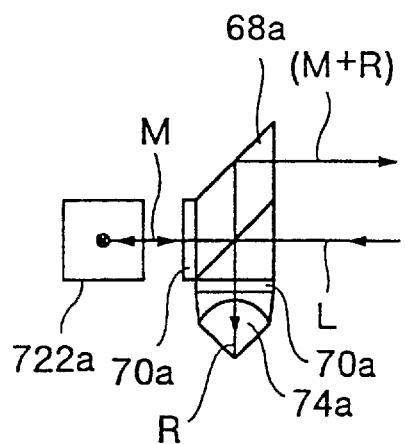
Figure 13:
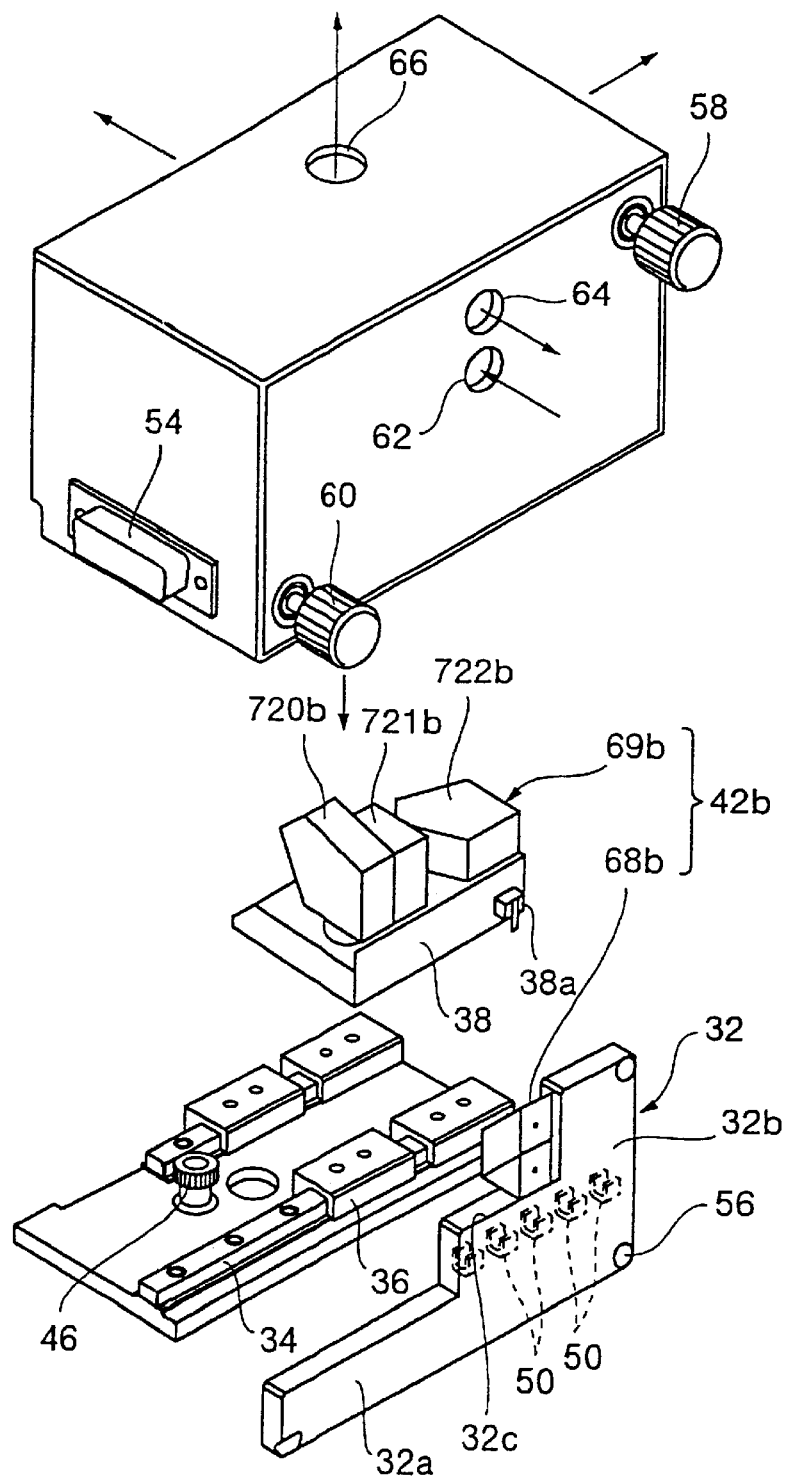
FIG. 13 is an exploded perspective view of the overall structure of the multiaxis interferometer of a third preferred embodiment of the multiaxis distance measurement device for NC machine tools according to the present invention.
Figure 14:
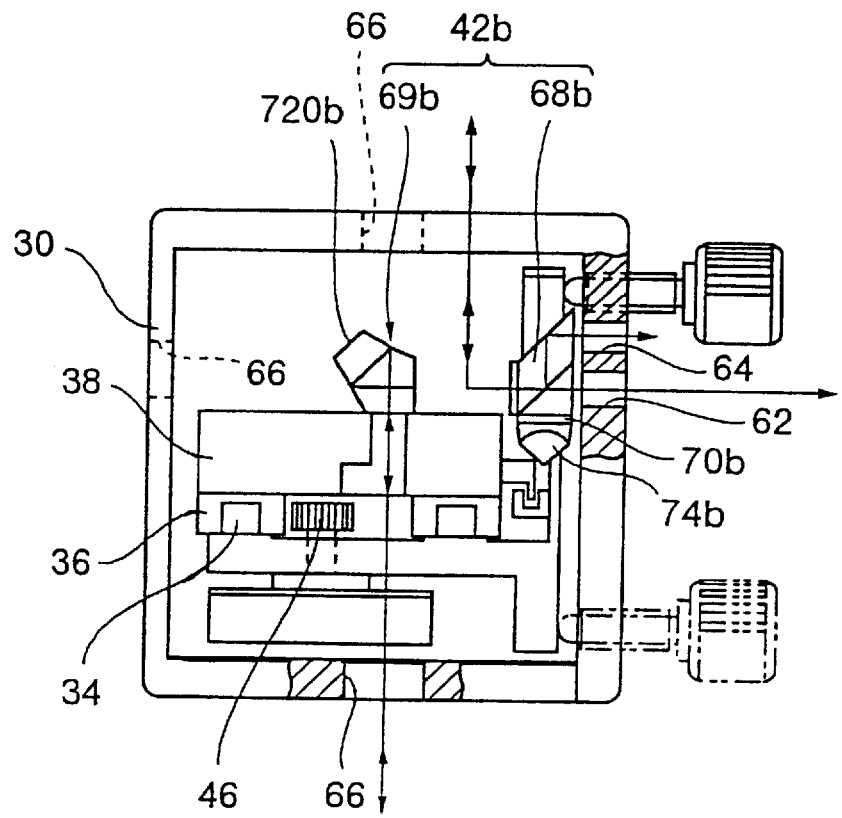
FIG. 14 is a cross-sectional view which shows the assembled condition of the multiaxis interferometer of FIG. 13.
Figure 15:
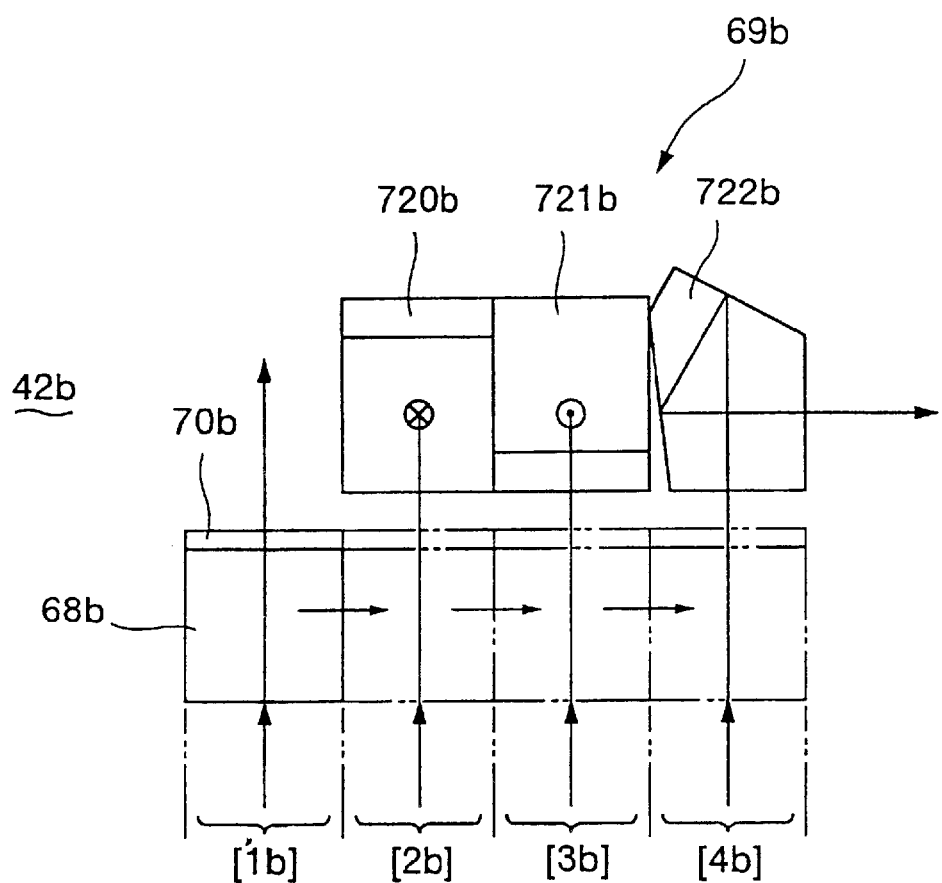
FIG. 15 is a plan view of the interferometer body of said interferometer.

With part [1a], shown in FIG. 12(a), the incoming beam L is split into measuring beam M, which is rectilinearly transmitted through polarization beam splitter 68a, and reference beam R, which proceeds downwards so as to be orthogonal to measuring beam M, and the interference beam (M+R) passes above and in the reverse direction of the incoming beam L.

With part [2a], although the reference beam R and the interference beam (M+R) travel along the same light paths as those of part [1a], the measuring beam M is reflected by mirror 720a and proceeds parallel to and in the same direction as reference beam R towards reflecting target 16 and returns along the same light path.

With part [3a], although the reference beam R and the interference beam (M+R) travel along the same light paths as those of part [1a], the measuring beam M is reflected by mirror 721a and proceeds parallel to but in the opposite direction of reference beam R towards reflecting target 16 and returns along the same light path.

With part [4a], although the reference beam R and the interference beam (M+R) travel along the same light paths as those of part [1a], the measuring beam M is reflected by mirror 722a and proceeds towards reflecting target 16 in the direction orthogonal to the optical axis of the incoming beam L and returns along the same light path.

By using the interferometer body 42a with the above arrangement, the respective axes of an NC machine tool can be measured automatically as in the first preferred embodiment described above. The present preferred embodiment also provides the following benefits. That is with the present preferred embodiment, the numbers of corner cubes and ¼ wave plates can be made less than those of the interferometer body 42 of the first preferred embodiment and since the light directing mechanism part 69a can be arranged from mirrors 720a to 722a, the multiaxis interferometer can be manufactured at low cost.

FIGS. 13 to 16 show a third preferred embodiment according to the present invention and the parts which are the same as or equivalent to those of the preferred embodiment described above are provided with the same symbols and their description shall be omitted. Only the characteristic points of this preferred embodiment shall be described next. As in the preferred embodiments described above, the interferometer body 42b in the third preferred embodiment shown in these Figures is comprised of a polarization beam splitter 68b and a light directing mechanism part 69b, which is disposed to the rear of polarization beam splitter 68b.

As with the second preferred embodiment described above, polarization beam splitter 68b is fixed to cutout part 32c, provided at vertical part 32b of the mounting base 32, and is set so that its front side faces the laser beam entrance and exit window parts 62 and 64. ¼ wave plates 70b are fixed respectively to the lower side and rear side of polarization beam splitter 68b and a corner cube 74b is fixed integrally to the lower side of one of the ¼ wave plates 70b.

As in the preferred embodiments described above, light directing mechanism part 69b is fixed on the stage 38 and is comprised of a part [1b], which causes the incoming light L from polarization beam splitter 68b to propagate rectilinearly, a part [2b], which reflects the incoming reflects the incoming light L from polarization beam splitter 68b downward, a part [3b], which reflects the incoming light L from polarization beam splitter 68b upward, and a part [4b], which reflects the incoming light L from polarization beam splitter 68b to the right side and these parts are disposed in a single row.

To be more specific, part [1b] is not provided with anything. Part [2b] is provided with a pentagonal prism 720b which reflects the incoming light L downward. Part [3b] is provided with a pentagonal prism 721b which reflects the incoming light L upward. Part [4b] is provided with a pentagonal prism 722b which reflects the incoming light L to the right side.

FIG. 16 shows the light paths of the respective parts [1b] to [4b] when beam splitter 68b is respectively positioned at the front sides of these parts [1b] to [4b] upon moving the stage 38 by driving motor 44.

Figure 16A:
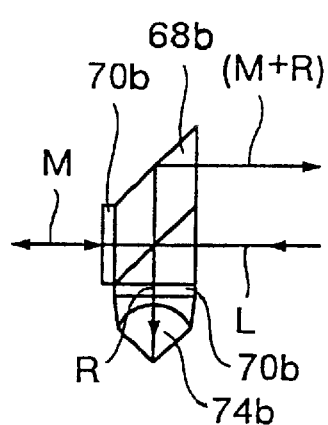
FIGS. 16(a) to 16(d) are explanatory diagrams of the light paths of the respective parts of the interferometer body shown in FIG. 15.
Figure 16B:
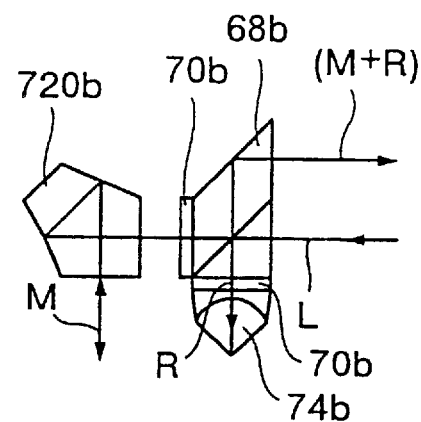
Figure 16C:
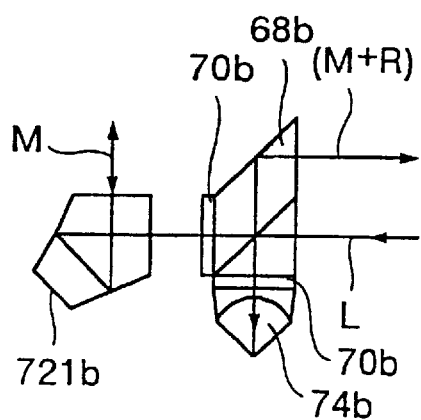
Figure 16D:
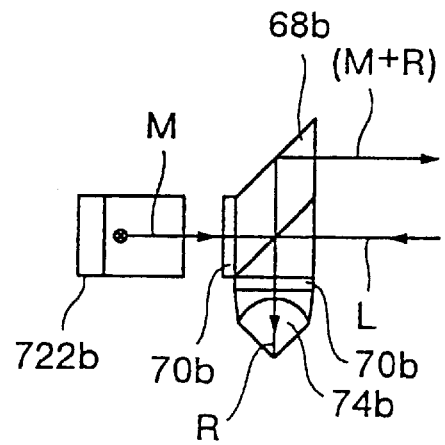
Figure 17:
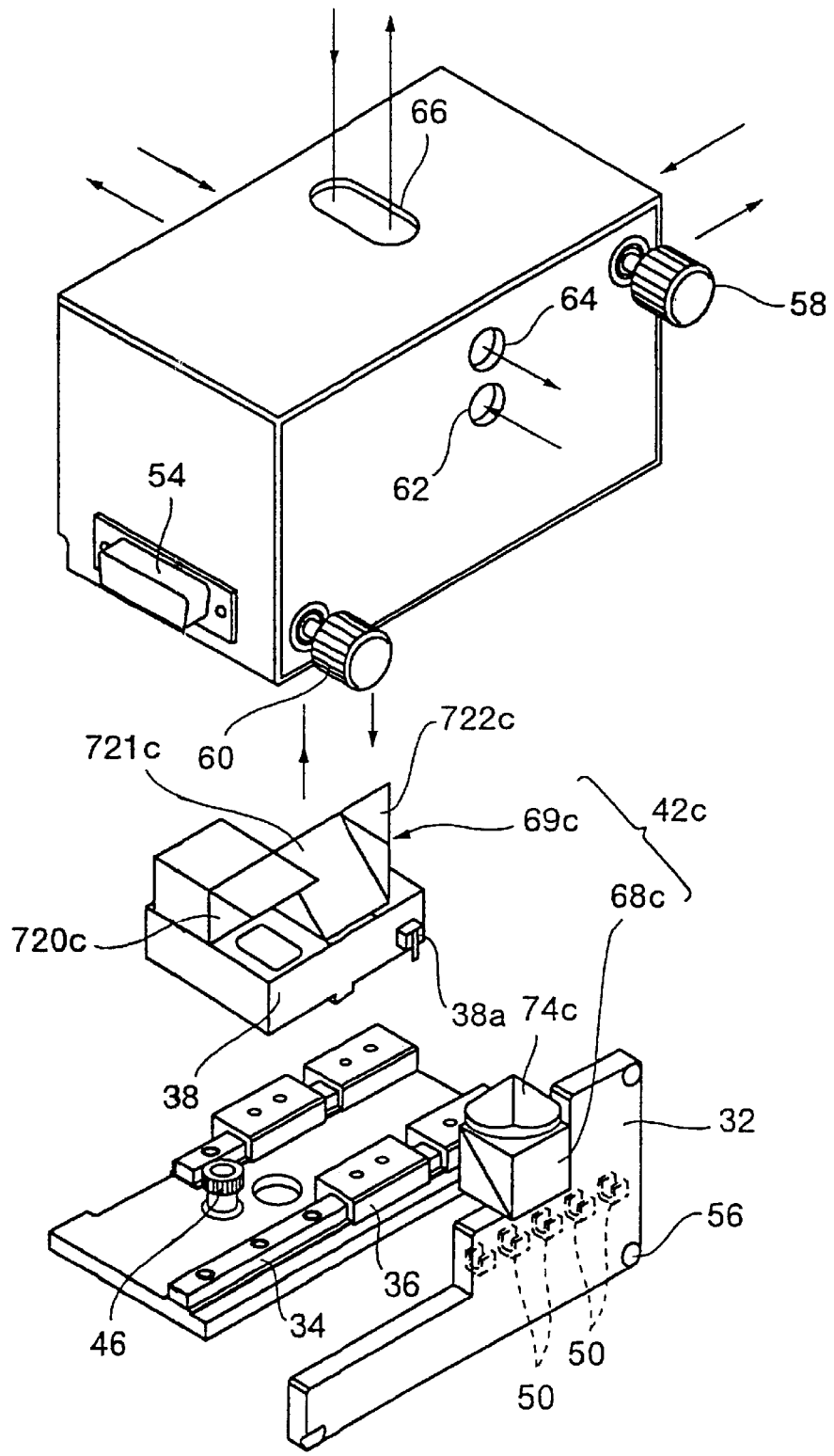
FIG. 17 is an exploded perspective view of the overall structure of the multiaxis interferometer of a fourth preferred embodiment of the multiaxis distance measurement device for NC machine tools according to the present invention.
Figure 18:
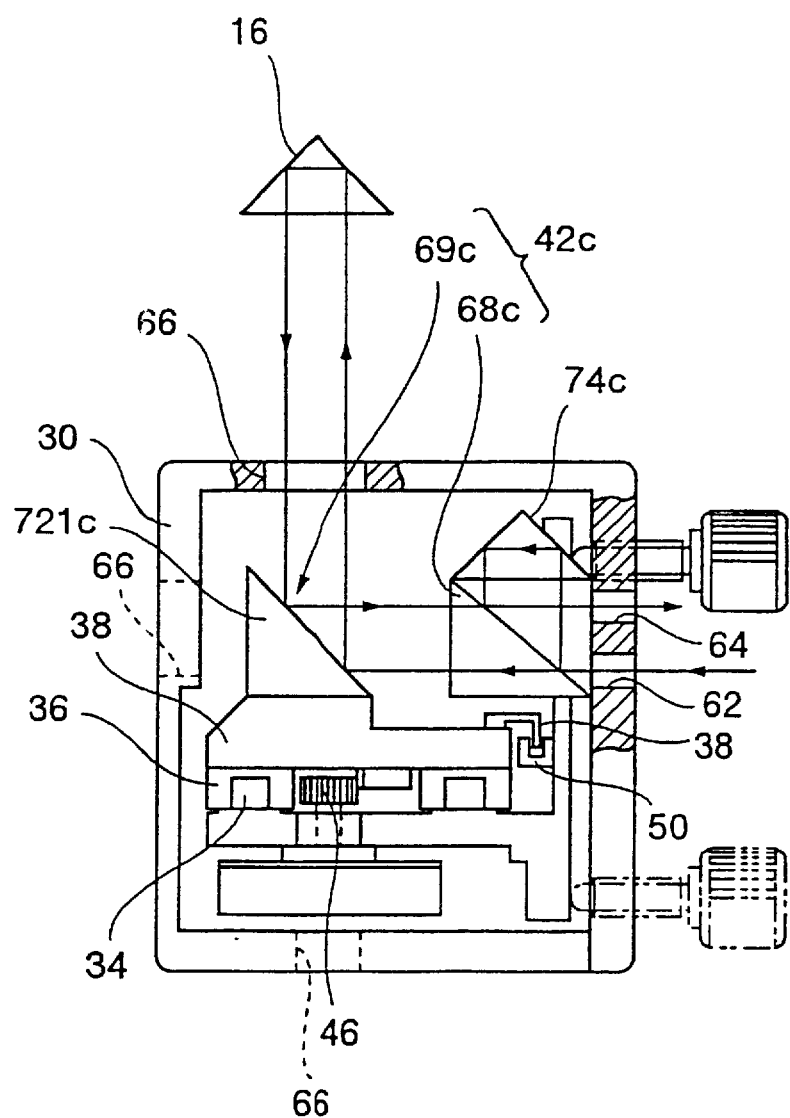
FIG. 18 is a cross-sectional view which shows the assembled condition of the multiaxis interferometer of FIG. 17.
Figure 19:
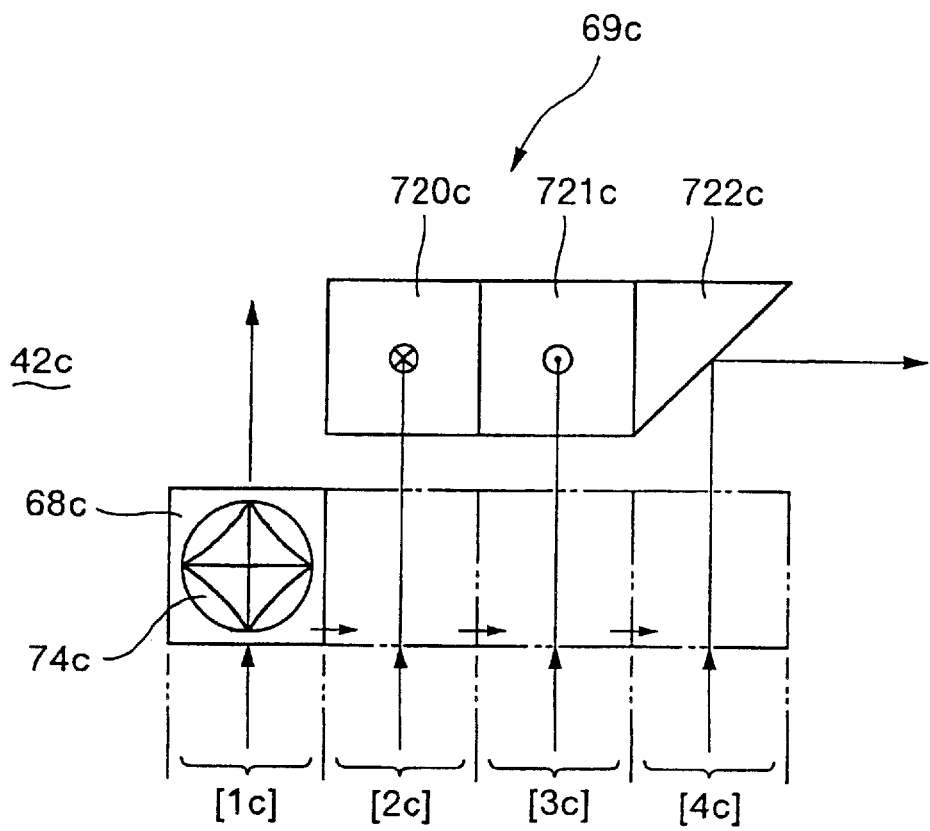
FIG. 19 is a plan view of the interferometer body of said interferometer.

With part [1b], shown in FIG. 16(a), the incoming beam L is split into measuring beam M, which is rectilinearly transmitted through polarization beam splitter 68b, and reference beam R, which proceeds downwards so as to be orthogonal to measuring beam M, and the interference beam (M+R) passes above and in the reverse direction of the incoming beam L.

With part [2b], although the reference beam R and the interference beam (M+R) travel along the same light paths as those of part [1b], the measuring beam M is reflected by pentagonal prism 720b and proceeds parallel to and in the same direction as reference beam R towards reflecting target 16 and returns along the same light path.

With part [3b], although the reference beam R and the interference beam (M+R) travel along the same light paths as those of part [1b], the measuring beam M is reflected by pentagonal prism 721b and proceeds parallel to but in the opposite direction of reference beam R towards reflecting target 16 and returns along the same light path.

With part [4b], although the reference beam R and the interference beam (M+R) travel along the same light paths as those of part [1b], the measuring beam M is reflected by pentagonal prism 722b and proceeds towards reflecting target 16 in the direction orthogonal to the optical axis of the incoming beam L and returns along the same light path.

By using the interferometer body 42b with the above arrangement, the respective axes of an NC machine tool can be measured automatically as in the first preferred embodiment described above. The present preferred embodiment also provides the following benefits. That is with the present preferred embodiment, the numbers of corner cubes and ¼ wave plates can be made less than those of the interferometer body 42 of the first preferred embodiment. Furthermore, since the light directing mechanism part 69b are arranged from pentagonal prisms 720b to 722b and light will always be emitted at a right angle by this type of prism even if the incoming light deflects slightly, the adjustment by adjusting knob 58 will be more easier than in the case of the second preferred embodiment.

FIGS. 17 to 21 show a fourth preferred embodiment according to the present invention and the parts which are the same as or equivalent to those of the preferred embodiment described above are provided with the same symbols and their description shall be omitted. Only the characteristic points of this preferred embodiment shall be described next. As in the preferred embodiments described above, the interferometer body 42c in the fourth preferred embodiment shown in these Figures is comprised of a polarization beam splitter 68c and a light directing mechanism part 69c, which is disposed to the rear of polarization beam splitter 68c.

As in the second preferred embodiment described above, polarization beam splitter 68c is fixed to cutout part 32c, provided at vertical part 32b of the mounting base 32, and is set so that its front side faces the laser beam entrance and exit window parts 62 and 64. A corner cube 74c is fixed integrally to the upper side of this polarization beam splitter 68c.

As in the preferred embodiments described above, light directing mechanism part 69c is fixed on the stage 38 and is comprised of a part [1c], which causes the incoming light L from polarization beam splitter 68c to propagate rectilinearly, a part [2c], which reflects the incoming reflects the incoming light L from polarization beam splitter 68c downward, a part [3c], which reflects the incoming light L from polarization beam splitter 68c upward, and a part [4c], which reflects the incoming light L from polarization beam splitter 68c to the right side and these parts are disposed in a single row.

To be more specific, part [1c] is not provided with anything. Part [2c] is provided with a mirror 720c which reflects the incoming light L downward. Part [3c] is provided with a mirror 721c which reflects the incoming light L upward. Part [4c] is provided with a mirror 722c which reflects the incoming light L to the right side.

FIG. 20 shows the light paths of the respective parts [1c] to [4c] when beam splitter 68c is respectively positioned at the front sides of these parts [1c] to [4c] upon moving the stage 38 by driving motor 44.

Figure 20A:
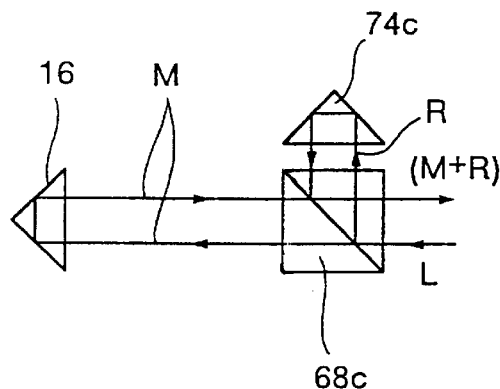
FIGS. 20(a) to 20(d) are explanatory diagrams of the light paths of the respective parts of the interferometer body shown in FIG. 19.
Figure 20B:
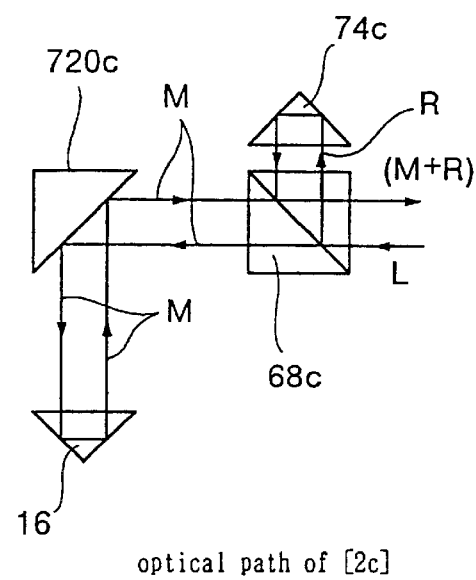
Figure 20C:
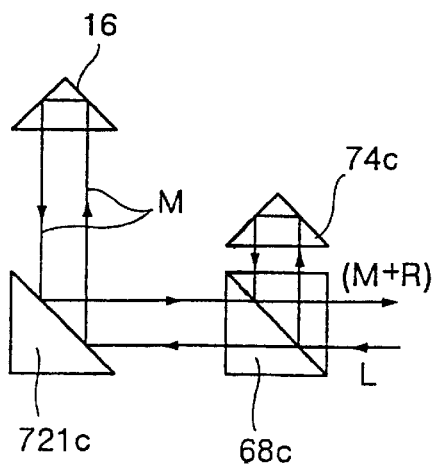
Figure 20D:
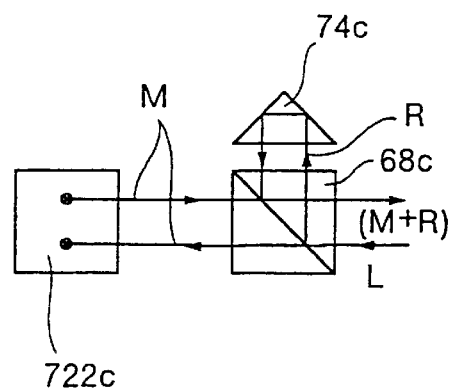

With part [1c], shown in FIG. 20(a), the incoming beam L is split into measuring beam M, which is rectilinearly transmitted through polarization beam splitter 68c, and reference beam R, which proceeds downwards so as to be orthogonal to measuring beam M. The measuring beam M is reflected by reflecting target 16 and returns along a different light path and the interference beam (M+R) passes above and in the reverse direction of the incoming beam L.

With part [2c], although the reference beam R and the interference beam (M+R) travel along the same light paths as those of part [1c], the measuring beam M is reflected by mirror 720c and proceeds parallel to and in the opposite direction of reference beam R towards reflecting target 16 and the light reflected by reflecting target 16 returns along a different light path.

With part [3c], although the reference beam R and the interference beam (M+R) travel along the same light paths as those of part [1c], the measuring beam M is reflected by mirror 721c and proceeds parallel to and in the same direction as reference beam R towards reflecting target 16 and the light reflected by reflecting target 16 returns along a different light path.

With part [4c], although the reference beam R and the interference beam (M+R) travel along the same light paths as those of part [1c], the measuring beam M is reflected by mirror 722c and proceeds towards reflecting target 16 in the direction orthogonal to the optical axis of the incoming beam L and and the light reflected by reflecting target 16 returns along a different light path.

Figure 21:
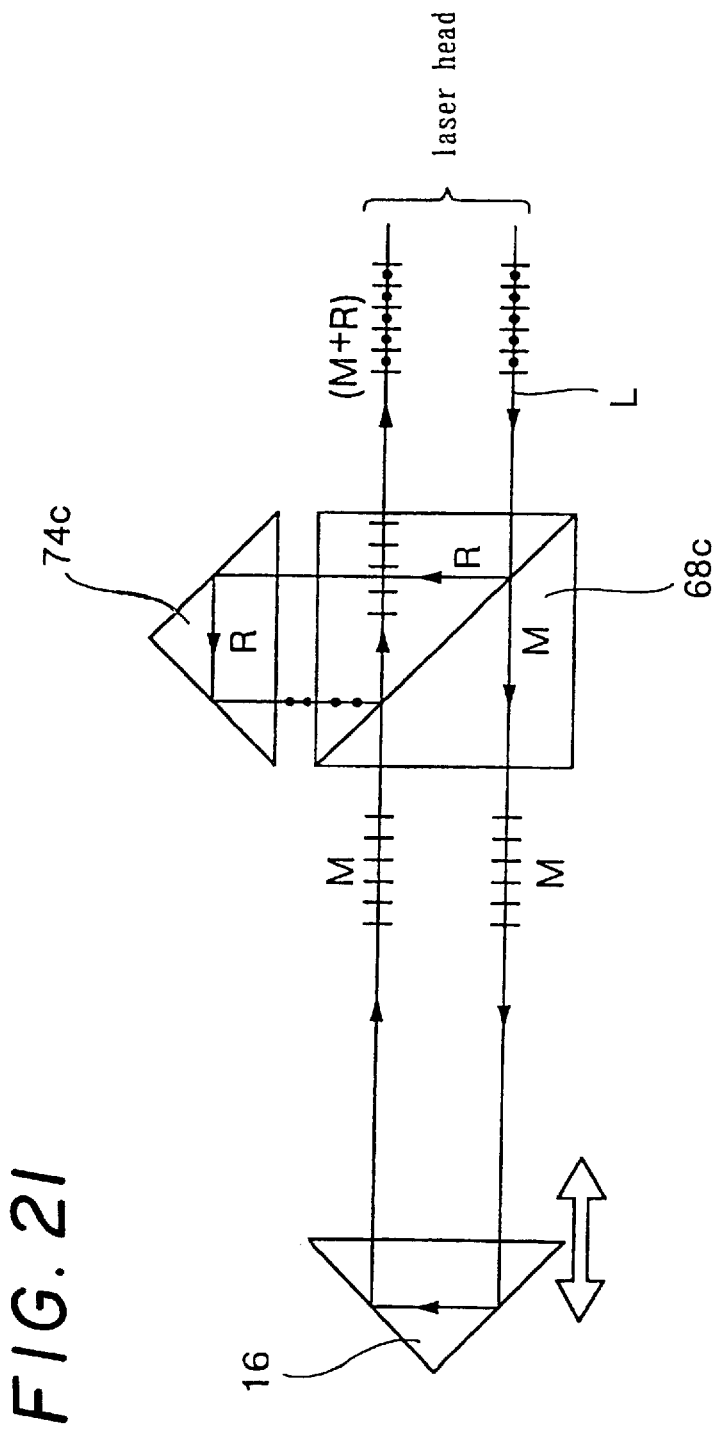
FIG. 21 is a schematic diagram which shows the measurement principles of the interferometer body of the fourth preferred embodiment.

With the interferometer body 42 of the present preferred embodiment, since the light paths toward reflecting targets 16 completely differ from the light path of return from targets 16, the polarization beam splitter 68c, mirror 720c, etc. that will be adopted will be larger than those of the second preferred embodiment. FIG. 21 shows the measurement principles of the interferometer body 42c. Although only the light path for part [1c] is shown in this example, the measurement principles are the same for the other parts except that the light paths are bent by mirrors 720c to 722c.

As shown in this Figure, the 45° linearly polarized incoming beam L, which is emitted from the laser head, is split by polarization beam splitter 68c into reference beam R, which propagates towards the fixed corner cube 74c, and measuring beam M, which propagates towards reflecting target 16 disposed at the measurement position.

The reference and measurement beams R and M, which were respectively reflected by reflecting target 16 and corner prism 74 are resynthesized at a position on polarization prism 68c that differs from the point of incidence are thereby made to interfere mutually. The resulting interference beam (M+R) is transmitted above the incoming beam L and is received by the light receiving part of the laser head 12 via laser beam exit window part 64.

If the position of the reflecting target 16 is moved forward or backward in the meantime, the condition of the interference fringes of the interference beam (M+R) changes. Thus, by electrically counting the amount of this change, the distance from the beam splitter 68c to the reflecting target 16 is measured and this measurement result is displayed on display 18.

By using the interferometer body 42c with the above arrangement, the respective axes of an NC machine tool can be measured automatically as in the first preferred embodiment described above. The present preferred embodiment also provides the following benefits. That is with the present preferred embodiment, although polarization beam splitter 68c, mirror 720c, etc. will be large since the light paths toward reflecting target 16 differ completely from the light paths of return from reflecting target 16, the interferometer body 42c will be low in cost since ¼ wave plates are not used at all in this preferred embodiment.

Figure 22:
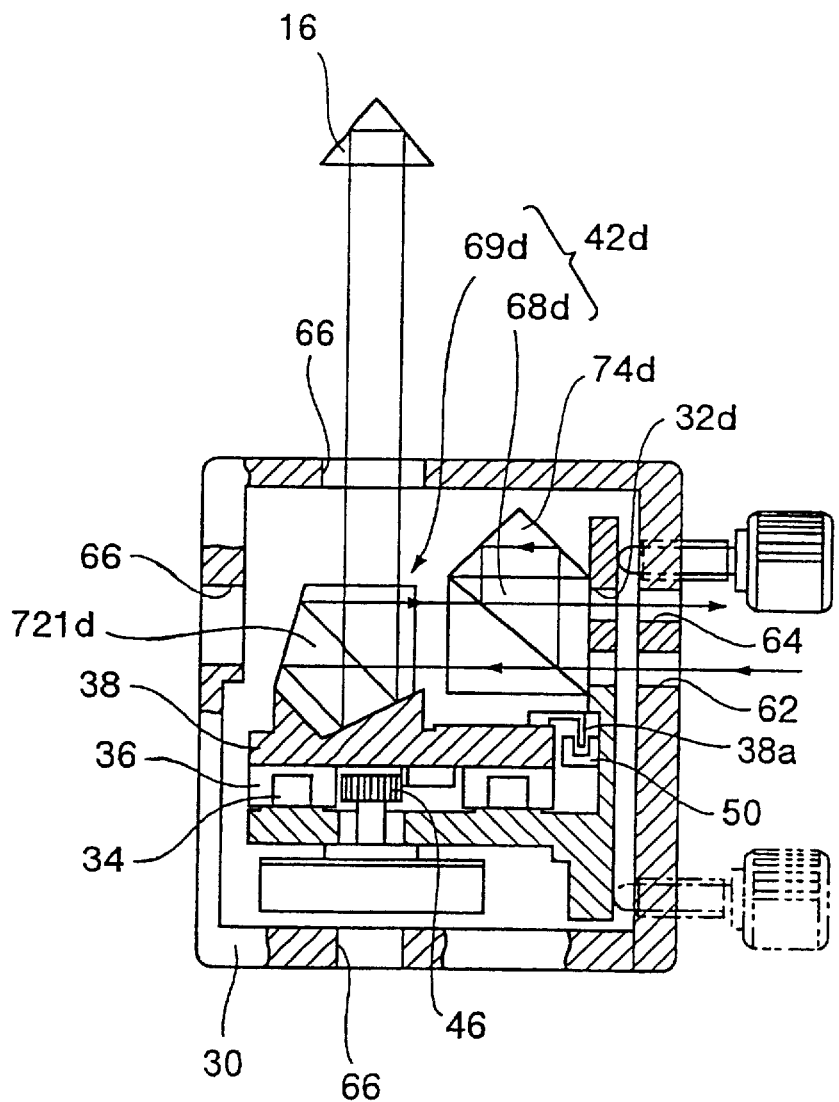
FIG. 22 is cross-sectional view of the multiaxis interferometer of a fifth preferred embodiment of the multiaxis distance measurement device for NC machine tools according to the present invention.
Figure 23A:
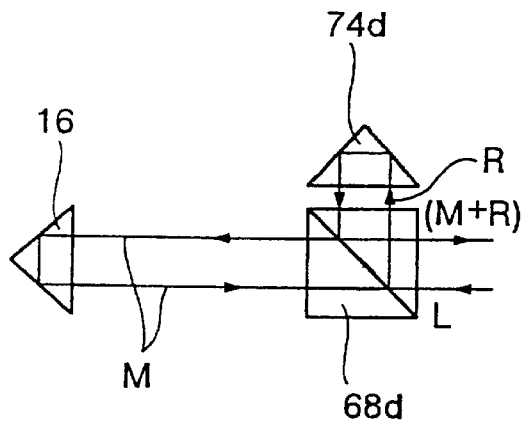
FIGS. 23(a) to 23(d) are explanatory diagrams of the light paths of the respective parts of the interferometer body shown in FIG. 22.
Figure 23B:
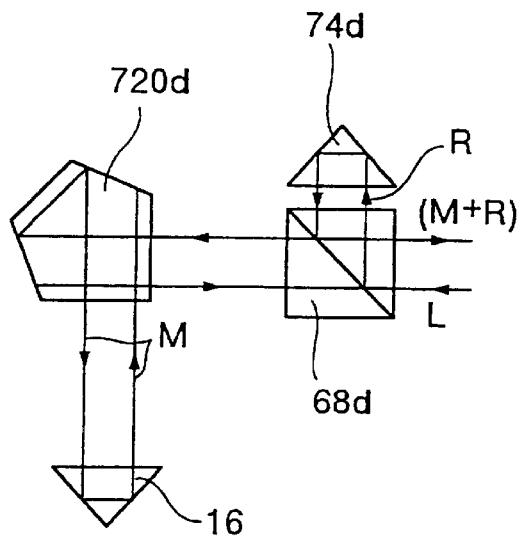
Figure 23C:
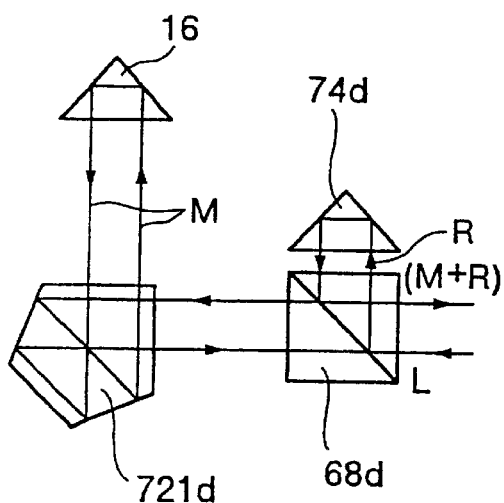
Figure 23D:
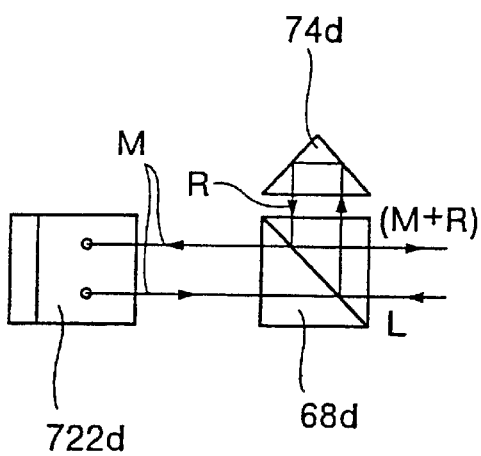

FIGS. 22 and 23 show a fifth preferred embodiment according to the present invention and the parts which are the same as or equivalent to those of the preferred embodiment described above are provided with the same symbols and their description shall be omitted. Only the characteristic points of this preferred embodiment shall be described next. As in the preferred embodiments described above, the interferometer body 42d in the fifth preferred embodiment shown in these Figures is comprised of a polarization beam splitter 68d and a light directing mechanism part 69d, which is disposed to the rear of polarization beam splitter 68d.

A polarization beam splitter 68d is fixed to the rear side of the vertical part 32b of the mounting base 32 and is set so that its front side faces the laser beam entrance and exit window parts 62 and 64. A pair of through holes 32d are bored in the vertical part 32b at the positions corresponding to the positions of entrance and exit window parts 62 and 64. A corner cube 74d is fixed integrally to the upper side of the polarization beam splitter 68d.

As in the preferred embodiments described above, the light directing mechanism part 69d is fixed on the stage 38 and is comprised of a part [1d], which causes the incoming light L from the polarization beam splitter 68d to propagate rectilinearly, a part [2d], which reflects the incoming light L reflects the incoming light L from the polarization beam splitter 68d downward, a part [3d], which reflects the incoming light L from the polarization beam splitter 68d upward, and a part [4d], which reflects the incoming light L from the polarization beam splitter 68d to the right side and these parts are disposed in a single row.

To be more specific, part [1d] is not provided with anything. Part [2d] is provided with a pentagonal prism 720d which reflects the incoming light L downward. Part [3d] is provided with a pentagonal prism 721d which reflects the incoming light L upward. Part [4d] is provided with a pentagonal prism 722d which reflects the incoming light L to the right side.

FIG. 23 shows the light paths of the respective parts [1d] to [4d] when beam splitter 68d is respectively positioned at the front sides of these parts [1d] to [4d] upon moving the stage 38 by driving motor 44.

With part [1d], shown in FIG. 23 (a), the incoming beam L is split into measuring beam M, which is rectilinearly transmitted through polarization beam splitter 68d, and reference beam R, which proceeds downwards so as to be orthogonal to measuring beam M. The measuring beam M is reflected by reflecting target 16 and returns along a different light path and the interference beam (M+R) passes above and in the reverse direction of the incoming beam L.

With part [2d], although the reference beam R and the interference beam (M+R) travel along the same light paths as those of part [1d], the measuring beam M is reflected by pentagonal prism 720d and proceeds parallel to and in the opposite direction of reference beam R towards reflecting target 16 and the light reflected by reflecting target 16 returns along a different light path.

With part [3d], although the reference beam R and the interference beam (M+R) travel along the same light paths as those of part [1c], the measuring beam M is reflected by pentagonal prism 721d and proceeds parallel to and in the same direction as reference beam R towards reflecting target 16 and the light reflected by reflecting target 16 returns along a different light path.

With part [4d], although the reference beam R and the interference beam (M+R) travel along the same light paths as those of part [1c], the measuring beam M is reflected by pentagonal prism 722d and proceeds towards reflecting target 16 in the direction orthogonal to the optical axis of the incoming beam L and and the light reflected by reflecting target 16 returns along a different light path.

Figure 24A:
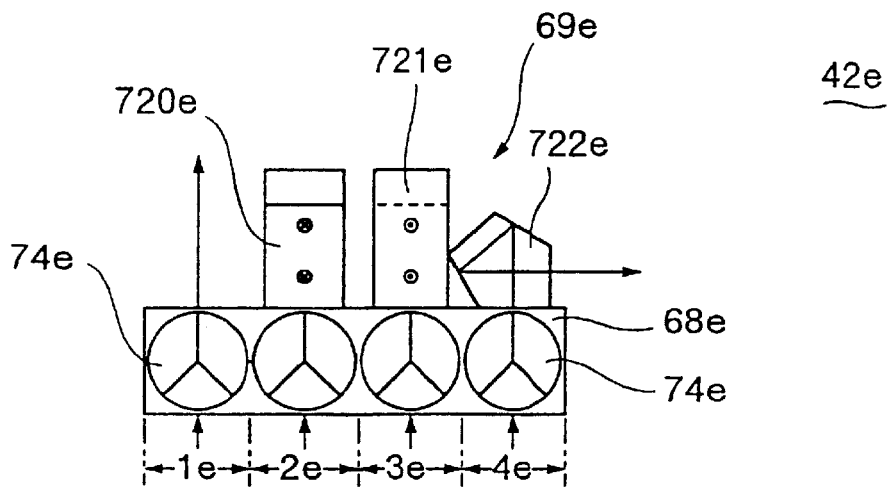
FIGS. 24(a) to 24(c) shows a front view, a plan view, and a side view of the interferometer body of a seventh preferred embodiment of the multiaxis distance measurement device for NC machine tools according to the present invention.
Figure 24B:
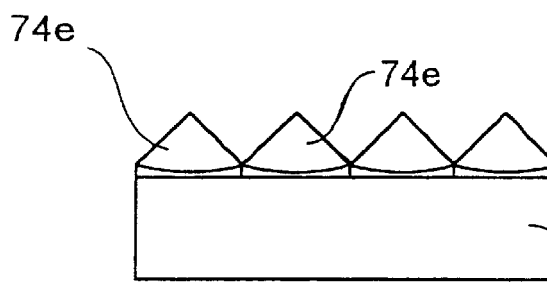
Figure 24C:
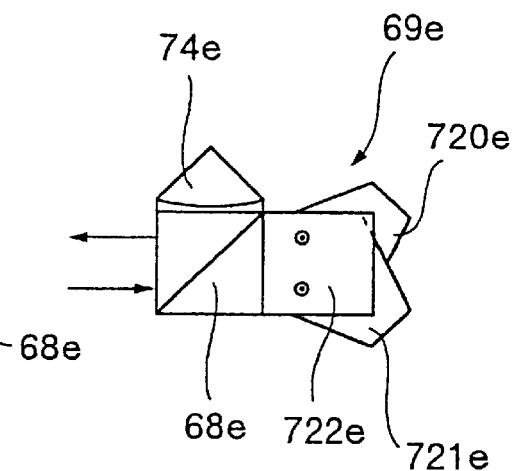

Effects that are equivalent to those of the fourth preferred embodiment described above can be obtained with the interferometer body 42d of the present preferred embodiment. FIGS. 24(a) to 24(c) show a sixth preferred embodiment according to the present invention. Only the characteristic points of this preferred embodiment shall be described next. As in the preferred embodiments described above, the interferometer body 42e in this preferred embodiment is comprised of a polarization beam splitter 68e and a light directing mechanism part 69e, which is disposed to the rear of polarization beam splitter 68e.

As in the first preferred embodiment, polarization beam splitter 68e is an optical component in common and is fixed on the stage 38 so that its front face faces the laser beam entrance and exit window parts 62 and 64. Four corner cubes 74e are fixed integrally to the upper side of this polarization beam splitter 68e.

As in the first preferred embodiment, light directing mechanism part 69d is fixed on the stage 38 and is comprised of a part [1e], which causes the incoming light L from polarization beam splitter 68e to propagate rectilinearly, a part [2e], which reflects the incoming reflects the incoming light L from polarization beam splitter 68e downward, a part [3e], which reflects the incoming light L from the polarization beam splitter 68e upward, and a part [4e], which reflects the incoming light L from polarization beam splitter 68e to the right side and these parts are disposed in a single row.

To be more specific, part [1e] is not provided with anything. Part [2e] is provided with a pentagonal prism 720e which reflects the incoming light L downward. Part [3e] is provided with a pentagonal 721e which reflects the incoming light L upward. Part [4e] is provided with a pentagonal prism 722e which reflects the incoming light L to the right side.

This sixth preferred embodiment takes the form in which the light paths toward reflecting targets 16 differ completely from the light paths of return from reflecting targets 16 and in which all of the ¼ wave plates 70 of the first preferred embodiment are omitted and thus provides effects equivalent to those of the fifth preferred embodiment.

Figure 25:
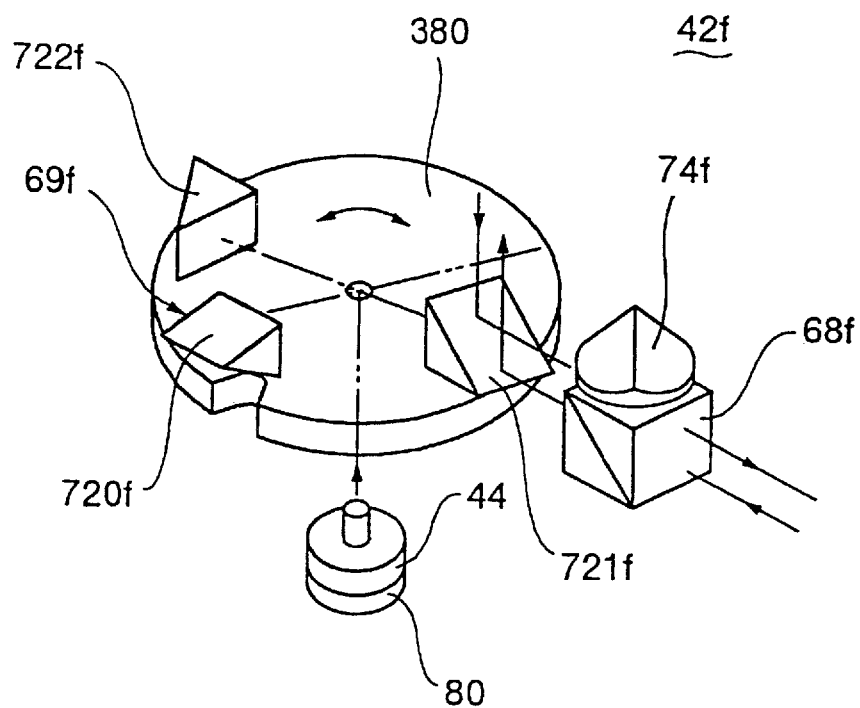
FIG. 25 is a perspective view of the major parts of the interferometer body of the seventh preferred embodiment of the multiaxis distance measurement device for NC machine tools according to the present invention.

FIGS. 25 shows a seventh preferred embodiment according to the present invention. Only the characteristic points of this preferred embodiment shall be described next. As in the preferred embodiments described above, the interferometer body 42f in the preferred embodiment shown in this Figure is comprised of a polarization beam splitter 68f and a light directing mechanism part 69f, which is disposed to the rear of polarization beam splitter 68f.

As in the fifth preferred embodiment, polarization beam splitter 68f is fixed on the rear side of vertical part 32b of the mounting base 32 so that its front face faces the laser beam entrance and exit window parts 62 and 64. A corner cube 74f is fixed integrally to the upper side of this polarization beam splitter 68f. On the other hand, light directing mechanism part 69f is comprised of three reflecting mirrors 720f, 721f, and 722f and these mirrors 720f, 721f, and 722f are respectively set and fixed on a disc-shaped rotating stage 380.

Rotating stage 380 is rotatably supported on a mounting plate 32 and is rotated and driven by an ultrasonic motor 44, whose rotating shaft is fixed to the center of the lower side of the rotating stage 380. The rotation position of the rotating stage 380 is detected by a rotary encoder 80 coupled to motor 44. The reflecting mirrors 720f, 721f, and 722f are disposed at the outer periphery of the rotating stage 380 so that they may face polarization beam splitter 58f.

Rotating stage 380 is divided at equal intervals of 90 degrees into four regions. Reflecting mirrors 720f, 721f, and 722f are disposed at three of these regions while nothing is disposed at the remaining region. With the interferometer body 42f having this arrangement, when the region which is not provided with anything is made to face polarization beam splitter 68f by rotating the rotating stage 380, the incoming beam L from polarization beam splitter 68f is made to propagate rectilinearly towards target 16.

When reflecting mirror 720f is made to face polarization beam splitter 68f by rotating rotating mirror 380, the incoming light from polarization beam splitter 68f is reflected downward. When reflecting mirror 721f is made to face polarization beam splitter 68f by rotating rotating mirror 380 further, the incoming light from polarization beam splitter 68f is reflected upward.

When reflecting mirror 722f is made to face polarization beam splitter 68f by rotating rotating mirror 380 even further, the incoming light from polarization beam splitter 68f is reflected to the right side.

That is, while the four parts of the light directing mechanism of the preferred embodiments up to the sixth preferred embodiment were arranged in a straight line, those of the seventh preferred embodiment are arranged along the circumferential direction of the rotating stage 380. The same effects as those of the other preferred embodiments can be obtained with the interferometer body 42f arranged in the above manner.

Figure 26:
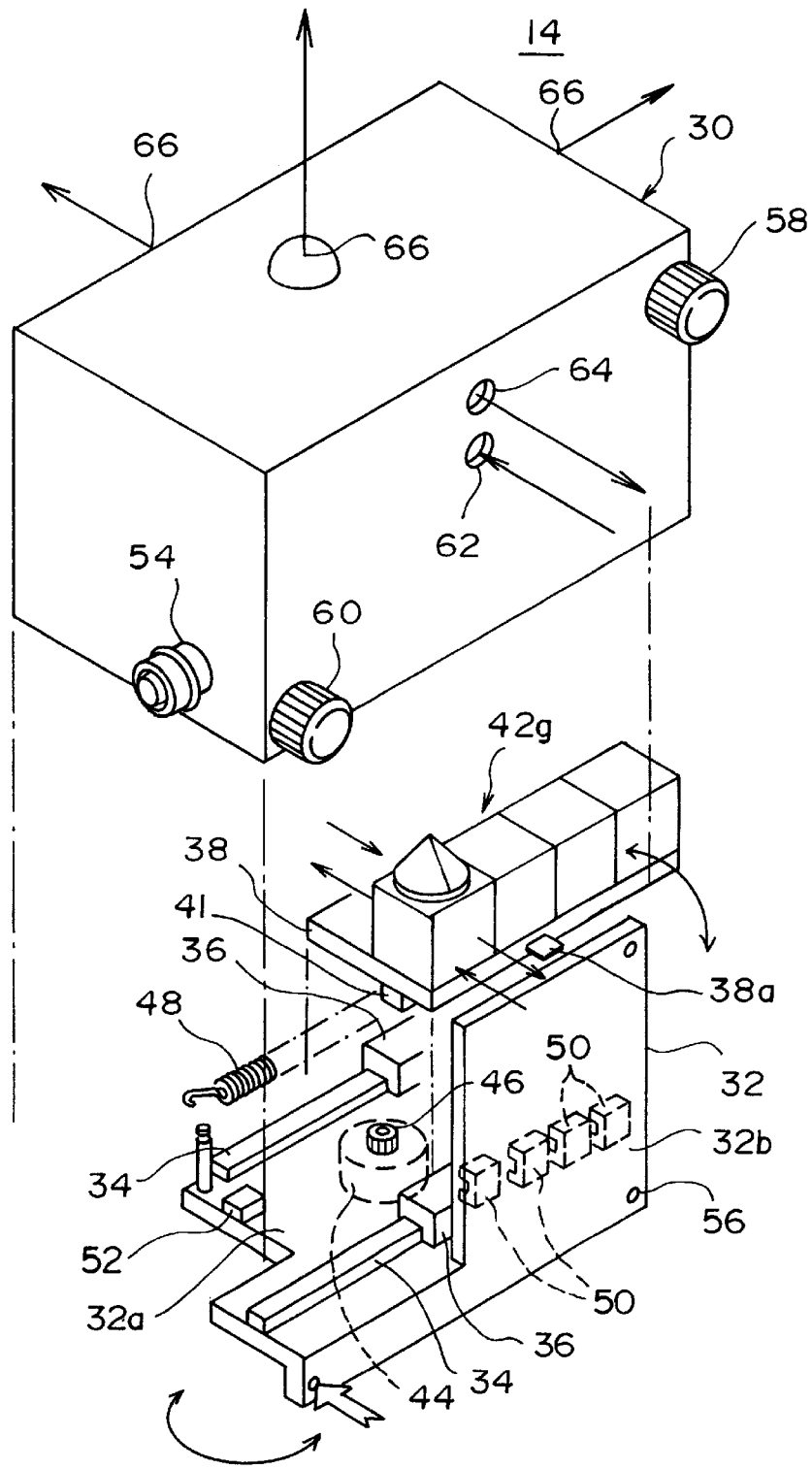
FIG. 26 is a disassembled perspective view of major parts of a multiaxis interferometer showing an eighth preferred embodiment of a multi-axis laser length measurement device for an NC machine tool according to the invention.
Figure 27:
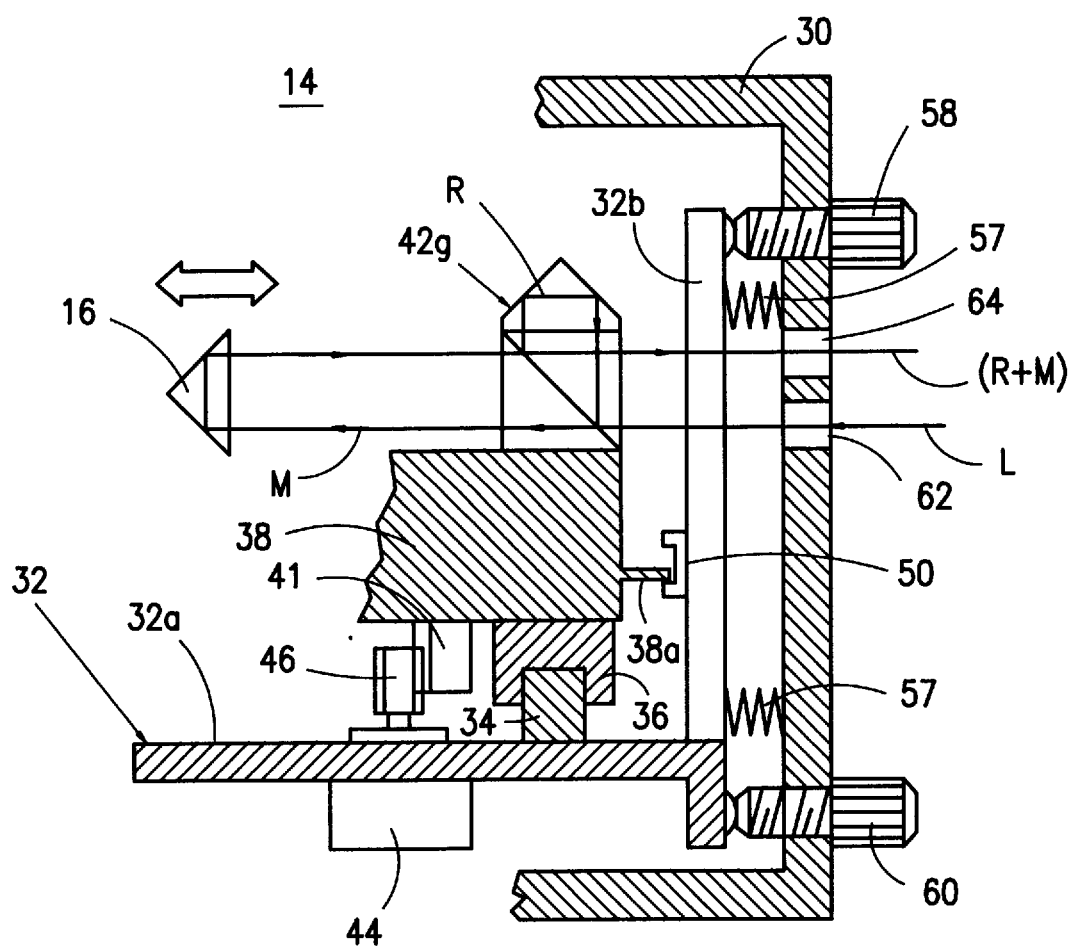
FIG. 27 is a cross-sectional view showing the assembled state of a multiaxis interferometer shown in FIG. 26.
Figure 30:
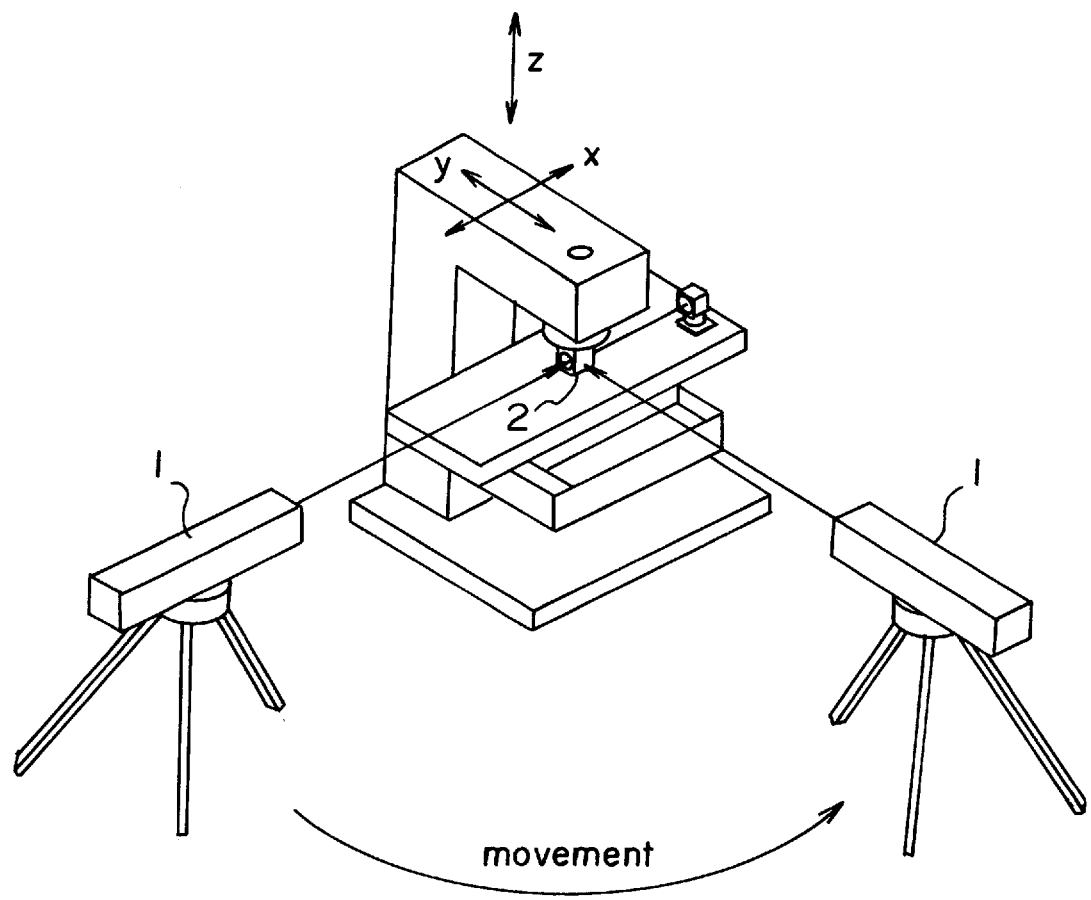
FIG. 30 is a schematic diagram which shows the layout of a prior art distance measurement device as applied to a knee type vertical milling machine.

FIGS. 26 and 29 show an eighth preferred embodiment according to the invention, and the portions which are the same as or equivalent to those of the preferred embodiments described above are provided with the same symbols and their descriptions shall be omitted. Only the portions that are characteristic of this preferred embodiment shall be described next. In the preferred embodiment shown in these drawings, the interferometer body 42g is different from the preferred embodiments described above, and the same is concurrently used as a light directing mechanism part in the abovementioned preferred embodiments.

The interferometer 42g is comprised of four polarization beam splitters 420g to 423g and four corner cubes 740 to 743 secured to one side of the respective polarization beam splitters 420g to 423g, and the polarization beam splitters 420 to 423g are disposed on stage 38 in a row so as to be opposite to the incident and outgoing window parts 62 and 64. They have the following portions [1g] to [4g].

At portion [1g], the reflection plane installed inside the polarization beam splitter 420g is inclined 45 degrees relative to the incident light and is disposed to cause the reflection light to be directed upward. A corner cube 740 is disposed on the upper face thereof.

At portion [2g], as at portion [1g], the reflection plane installed inside the polarization beam splitter 421g is inclined 45 degrees relative to the incident light and is disposed to cause the reflection light to be directed upward. A corner cube 741 is disposed on the upper face thereof. At portion [3g], the reflection plane installed inside the polarization beam splitter 422g is inclined 45 degrees relative to the incident light and is disposed to cause the reflection light to be directed upward. A corner cube 742 is disposed at the rear face thereof.

At portion [4g], the reflection plane installed inside the polarization beam splitter 423g is inclined 45 degrees relative to the incident plane, and the reflection light is disposed so as to be directed to rightward. A corner cube 743 is disposed at the rear face thereof.

FIG. 29 is a detailed view showing optical paths of an interferometer body 42 of this preferred embodiment. In the same drawing, at portion [1g], the incident light of 45° degree linear polarization, which outgoes from the laser head 12, is divided by polarization beam splitter 420g into a reference light R which is directed to the fixed corner cube 740, and a measurement light M which is directed to the reflection target 16 disposed at the measurement position, wherein the reference light R and measurement light M reflected at the reflection target 16 and by the corner cube 740 are again overlapped to each other and are made interfered light (M+R). The interfered light (M+R) pass through upward of the incident light L and are received by the laser head 12. At portions [2g] to [4g], only the orientation of polarization beam splitters 421g to 423g is different, and the principle of measurement is identical to each other.

According to a length measurement device constructed as described above, although the polarization beam splitters 420g to 423g are made slightly large since the optical path directing to the reflection target 16 is completely different from that returning from the reflection target 16, the function of light directing mechanism part is enabled by the interferometer body 42a. Therefore, the number of parts is decreased, and a better practicability is increased.

Although the work procedure in the above preferred embodiments were performed in the order of the axes x, y, z, this order can be changed as suited.

Furthermore, although the multiaxis interferometer 14 in the preferred embodiments enable length measurements for the upper side and the lower side in the z axis direction, arrangements can be made to measure only one side or both sides as necessary.

What is claimed is:

1. A multiaxis distance measurement device for NC machine tools comprising:

a laser head equipped with a light emitting part for emitting a laser beam and a light receiving part for receiving an interference beam, a multiaxis interferometer equipped with a light directing mechanism part which is disposed on the optical axes of the light emitting part and the light receiving part and splits and then projects the incoming laser beam sequentially toward the orthogonal x, y, and z axes of the NC machine tool, said multiaxis interferometer including means for sequentially moving the light directing mechanism part such that said split and projected laser beam is aligned toward only one of said orthogonal x, y, and z axes at one time, and switching mechanism connected to said moving means for controlling the movement of the light directing mechanism part, a plurality of reflecting targets which are fixed on the measurement positions of the NC machine tool and receive the laser beam projected in the x, y, or z axis direction and reflect the beam back toward the multiaxis interferometer, a controller for controlling the switching mechanism, and a control unit, which operates the NC machine tool in the x, y, and z axis directions in accordance with a prescribed procedure that compares the length measurement date obtained at the light receiving part of the laser head with priorly set reference data to provide the NC machine tool with correction values, and commands the switching operating to the controller each time the measurements for one of the axes, x, y, and z, have been completed.

2. A multiaxis distance measurement device for NC machine tools set forth in claim 1, wherein:

the multiaxis interferometer comprises:

a casing having an entrance/exit window part which faces the laser head, a stage, which is disposed within the casing in a linearly movable or rotatably movable manner so that it may face the entrance/exit window part, an interferometer body having the light directing mechanism part, which emits the incoming laser beam in the x, y, and z axis directions, a moving mechanism for moving the stage linearly or rotatably to cause the light directing mechanism part to face the entrance/exit window part, and a detection means for detecting the stoppage position of the stage.

3. A multiaxis distance measurement device for NC machine tools set forth in claim 2, wherein:

the interferometer body is equipped with a polarization beam splitter, which is disposed along the movement direction of the moving mechanism and fixed on the stage, and a light directing mechanism part, which is set at the rear of the polarization beam splitter, said light directing mechanism part having a part for causing the incoming beam from the polarization beam splitter to propagate rectilinearly, a part for reflecting the incoming beam from the polarization beam splitter upward or downward, and a part for reflecting the incoming beam from the polarization beam splitter to the side.

4. A multiaxis distance measurement device for NC machine tools set forth in claim 1, wherein:

the measuring beam emitted from the light directing mechanism part is reflected back along the same light path by the reflecting target set at the object of measurement.

5. A multiaxis distance measurement device for NC machine tools set forth in claim 2, wherein:

the interferometer body is equipped with a polarization beam splitter, which is fixed to the rear side of the entrance/exit window part, and a light directing mechanism part, which is set on the stage, said light directing mechanism part having a part for causing the incoming beam from the polarization beam splitter to propagate rectilinearly, a part for reflecting the incoming beam from the polarization beam splitter upward or downward, and a part for reflecting the incoming beam from the polarization beam splitter to the side.

6. A multiaxis distance measurement device for NC machine tools as set forth in claim 5, wherein:

the measuring beam emitted from the light directing mechanism part is reflected along a light path that is parallel to but different from the incident light path by the reflecting target set at the object of measurement.

7. A multiaxis distance measurement device for NC machine tools set forth in claim 1, wherein the multiaxis interferometer comprises:

a casing having an entrance/exit window part which faces the laser head;

a stage, which is disposed within the casing in a linearly movable manner so that it may face the entrance/exit window part;

an interferometer body which is supported on the stage and emits the incident laser beam in the x, y, z directions;

a moving mechanism for moving the stage linearly to cause the interferometer body to face the entrance/exit window part, and a detection means for detecting the stoppage position of the stage.

8. A multiaxis distance measurement device for NC machine tools set for in claims 3 or 5 wherein said light directing mechanism part includes a plurality of mirrors.

9. A multiaxis distance measurement device for NC machine tools set for in claims 3 or 5 wherein said light directing mechanism part includes a plurality of pentaprisms.

10. A multiaxis distance measurement device for NC machine tools set forth in claims 3 or 5 wherein said light directing mechanism part includes a plurality of polarizing beam splitters, each of which includes a corner cube.

\* \* \* \* \*